(12) United States Patent
Schöller et al.

(10) Patent No.: US 10,731,097 B2
(45) Date of Patent: Aug. 4, 2020

(54) VISCOSITY INDEX IMPROVERS WITH DEFINED MOLECULAR WEIGHT DISTRIBUTIONS

(71) Applicant: Evonik Operations GmbH, Essen (DE)

(72) Inventors: Katrin Schöller, Darmstadt (DE); Sarah Lippert, Darmstadt (DE); Wolfgang Tschepat, Darmstadt (DE); Klaus Schimossek, Bensheim (DE)

(73) Assignee: Evonik Operations GmbH, Essen (DE)

( * ) Notice: Subject to any disclaimer, the term of this patent is extended or adjusted under 35 U.S.C. 154(b) by 115 days.

(21) Appl. No.: 16/119,878

(22) Filed: Aug. 31, 2018

(65) Prior Publication Data

US 2019/0071615 A1    Mar. 7, 2019

(30) Foreign Application Priority Data

Sep. 4, 2017 (EP) .................................. 17189194

(51) Int. Cl.
*C10M 145/14* (2006.01)
*C08F 290/04* (2006.01)
(Continued)

(52) U.S. Cl.
CPC ............ *C10M 145/14* (2013.01); *C08C 19/28* (2013.01); *C08F 220/18* (2013.01);
(Continued)

(58) Field of Classification Search
CPC .............. C10M 119/16; C10M 145/14; C10M 145/22; C10M 2209/084; C10M 2209/102;
(Continued)

(56) References Cited

U.S. PATENT DOCUMENTS 3,732,334 A    5/1973   Koch et al.
3,772,196 A   11/1973   St. Clair et al.
(Continued)

FOREIGN PATENT DOCUMENTS

DE    1 520 696    4/1969
EP    0 668 342    8/1995
(Continued)

OTHER PUBLICATIONS

Third Party Observations submitted Oct. 10, 2019 in EP 18 190 876.5 with experimental data annex, 6 pages.
(Continued)

*Primary Examiner* — James C Goloboy
(74) *Attorney, Agent, or Firm* — Grüneberg and Myers PLLC

(57) ABSTRACT

Polyalkyl(meth)acrylate based comb polymers with weight-average molecular weights of 700,000 g/mol or greater and number-average molecular weights of 130,000 g/mol or greater can be used to improve the high temperature-high shear performance of lubricant compositions, especially of engine oil (EO) compositions. These polymers can be obtained in a reaction mixture comprising monomers, a dilution oil, and an initiator. The resulting lubricant compositions can have improved kinematic viscosity and high temperature high shear performance.

17 Claims, 10 Drawing Sheets

(51) Int. Cl.

| | | |
|---|---|---|
| C08C 19/28 | (2006.01) | |
| C08F 220/18 | (2006.01) | |
| C10N 20/02 | (2006.01) | |
| C10N 20/04 | (2006.01) | |
| C10N 30/02 | (2006.01) | |
| C10N 30/00 | (2006.01) | |
| C10N 40/25 | (2006.01) | |
| C10N 70/00 | (2006.01) | |

(52) U.S. Cl.
CPC .... *C08F 290/048* (2013.01); *C08F 220/1804* (2020.02); *C08L 2203/40* (2013.01); *C10M 2209/084* (2013.01); *C10N 2020/02* (2013.01); *C10N 2020/04* (2013.01); *C10N 2030/02* (2013.01); *C10N 2030/54* (2020.05); *C10N 2030/68* (2020.05); *C10N 2030/74* (2020.05); *C10N 2040/25* (2013.01); *C10N 2070/00* (2013.01)

(58) Field of Classification Search
CPC ..... C10M 2209/1026; C10N 2220/021; C10N 2220/022; C10N 2230/02; C10N 2230/08; C10N 2230/54; C10N 2230/68; C10N 2230/74; C10N 2240/10; C10N 2270/00; C08C 19/28; C08F 220/18; C08F 220/1804; C08F 290/048; C08L 2203/40
See application file for complete search history.

(56) References Cited

U.S. PATENT DOCUMENTS

| | | |
|---|---|---|
| 4,116,917 A | 9/1978 | Eckert |
| 4,788,316 A | 11/1988 | Thornthwaite et al. |
| 5,565,130 A * | 10/1996 | Omeis .................. C08F 290/04 508/262 |
| 2007/0213237 A1 | 9/2007 | Scherer et al. |
| 2008/0194443 A1 | 8/2008 | Stohr et al. |
| 2009/0118150 A1 | 5/2009 | Baum et al. |
| 2010/0190671 A1 | 7/2010 | Stoehr et al. |
| 2011/0306533 A1 | 12/2011 | Eisenberg et al. |
| 2016/0097017 A1 * | 4/2016 | Eisenberg ............ C10M 149/06 508/503 |

FOREIGN PATENT DOCUMENTS

| | | |
|---|---|---|
| EP | 0 776 959 | 6/1997 |
| EP | 1 029 029 | 8/2000 |
| GB | 2 270 317 | 3/1994 |
| JP | 2017-31400 | 2/2017 |
| JP | 2017031400 A * | 2/2017 |
| WO | 1996/030421 | 10/1996 |
| WO | 1997/018247 | 5/1997 |
| WO | 1997/021788 | 6/1997 |
| WO | 1997/047661 | 12/1997 |
| WO | 1998/001478 | 1/1998 |
| WO | 1998/040415 | 9/1998 |
| WO | 1999/010387 | 3/1999 |
| WO | 1999/041332 | 8/1999 |
| WO | 2000/008115 | 2/2000 |
| WO | 2000/014179 | 3/2000 |
| WO | 2000/014183 | 3/2000 |
| WO | 2000/014187 | 3/2000 |
| WO | 2000/014188 | 3/2000 |
| WO | 2000/015736 | 3/2000 |
| WO | 2001/018156 | 3/2001 |
| WO | 2001/057166 | 8/2001 |
| WO | 2004/083169 | 9/2004 |
| WO | 2006/007934 | 1/2006 |
| WO | 2007/003238 | 1/2007 |
| WO | 2013/189951 | 12/2013 |

OTHER PUBLICATIONS

Roy M. Mortier et al, Chemistry and Technology of Lubricants, 3rd Ed., 2010, pp. 156-157.
Kobunshi Ronbunshu, vol. 34, No. 7, pp. 503-510 (Jul. 1977).
Stöhr et al., "Lubricant and Fuel Additives Based on Polyalkylmethacrylates," *Polymer Science: A Comprehensive Reference*, vol. 10, Set 10, pp. 453-478, 2012, Elsevier B.V.
European Search Report dated Jan. 24, 2018 in European Application 17189194.8.

* cited by examiner

VISCOSITY INDEX IMPROVERS WITH DEFINED MOLECULAR WEIGHT DISTRIBUTIONS

CROSS REFERENCE TO RELATED APPLICATIONS

This application claims the benefit of European Application No. EP17189194, filed on Sep. 4, 2017, the entirety of which is incorporated herein by reference.

BACKGROUND OF THE INVENTION

Field of the Invention

The present invention is directed to polyalkyl(meth)acrylate based comb polymers with weight-average molecular weights of 700.000 g/mol or greater and number-average molecular weights of 130.000 g/mol or greater, their preparation, lubricant compositions comprising such comb polymers and their use to improve the high temperature-high shear performance of lubricant compositions, especially of engine oil (EO) compositions.

Global government vehicle regulations demand ever better fuel economy to reduce greenhouse gas emissions and conserve fossil fuels. There is an increasing demand for more fuel-efficient vehicles in order to meet the targets regarding $CO_2$ emissions. Therefore, any incremental improvement in fuel economy (FE) is of great importance in the automotive sector.

Lubricants are playing an important role in reducing a vehicle's fuel consumption and there is a continuing need for improvements in fuel economy performance.

Formulations of motor oils are generally defined by the SAE J300 standard (SAE=Society of Automotive Engineers). This standard classifies motor oils into the SAE viscosity grades xW-y where x=0, 5, 10, 15, 20, 35 and y=8, 12, 16, 20, 30, 40, 50, 60. This is done e.g. via the kinematic viscosity KV (ASTM D445) and the high-temperature high-shear viscosity HTHS (ASTM D4683, D4741 and D5471), which parameters are important for engine protection.

Lubricant properties are typically improved by the addition of additives to lubricating oils. Viscosity index (VI) improvers are generally added to a lubricant to improve its thickening efficiency and to protect the engine.

The thickening efficiency of a VI improver is specified by its $KV_{100}$ (kinematic viscosity at 100° C.) at a given treat rate. A higher $KV_{100}$ at the same treat rate is considered to be beneficial for net treat cost and performance criteria. It is well known that with an increase of the thickening efficiency also the high-temperature high-shear stability $HTHS_{100}$ is raising what means that a careful balance is needed in the development of new VI improvers.

The thickening effect of a polymer increases as its hydrodynamic volume in the oil increases. Increasing temperature increases the solvency of the oil, which, in turn, promotes the uncoiling of the polymer and results in a larger hydrodynamic volume.

Description of the Related Art

The hydrodynamic volume of a polymer in solution depends on many parameters, such as for example the polymer chain length and composition (Stöhr et al.: Lubricant and Fuel Additives Based on Polyalkylmethacrylates; Polymer Sciences: A Comprehensive Reference, Volume 10, set 10, 453-478). The longer a polymer chain, the higher is usually the weight-average molecular weight $M_w$.

Comb polymers are well known in the art to be efficient VI improvers.

U.S. Pat. No. 5,565,130 discloses comb polymers and their use a viscosity index improvers. The working examples comprise 10-80% of macromonomer and 20-90% of C1-10 alkyl (meth)acrylates which show molecular weights $M_w$ in the range of 119.000 to 325.000 g/mol. Number-average molecular weights $M_n$ are not mentioned and an effect of the presented comb polymers on thickening efficiency and HTHS performance is not disclosed therein.

WO 2007/003238 A1 describes oil-soluble comb polymers based on polyolefin-based macromonomers, especially polybutadiene-based methacrylic esters, and C1-C10 alkyl methacrylates. The working examples comprise 37.2 to 53.3% of macromonomer, 12.3 to 61% of C1-4 alkyl (meth) acrylates and 12 to 42.6% of styrene. The weight-average molecular weight $M_w$ of the working examples is in the range of 79.000 to 402.000 g/mol and D varies from 3.7 to 16.6. The comb polymers can be used as an additive for lubricant oils to improve the viscosity index and shear stability. However, an effect of the presented comb polymers on thickening efficiency and HTHS performance is not disclosed therein.

US 2010/0190671 discloses the use of comb polymers based on polyolefin-based macromonomers, especially polybutadiene-based methacrylic esters, and C1-C10 alkyl methacrylates for improving the fuel consumption of motor vehicles. The weight-average molecular weight $M_w$ of the working examples is in the range of 191.000 to 374.000 g/mol and D varies between 3.5 and 4.5.

US 2011/306533 discloses comb polymers comprising 40 to 80% by weight of repeat units derived from polyolefin-based macromonomers and 3 to 20% by weight of repeat units derived from dispersing monomers (see working examples) and their use as antifatigue additives. The weight-average molecular weight $M_w$ of those comb polymers is generally defined to be in the range from 20.000 to 1.000.000 g/mol, more preferably 50.000 to 500.000 g/mol and most preferably 150.000 to 450.000 g/mol. The number-average molecular weight $M_n$ of those comb polymers is generally defined to be in the range from 20.000 to 800.000 g/mol, more preferably 40.000 to 200.000 g/mol and most preferably 50.000 to 150.000 g/mol. Specific values for the working examples are not disclosed. Results are only given for studies on fatigue performance.

There is still further need to improve the $KV_{100}$, $HTHS_{100}$ and $HTHS_{150}$ performance of a VI improver even more to fulfill stronger formulation criteria for lubricating oil compositions and especially engine oil formulations.

For example, according to SAE J300, the $KV_{100}$ for a 0W20 engine oil formulation should be at least 6.9 mm²/s at a given $HTHS_{150}$ of 2.6 mPas for sufficient engine protection. That means that the $HTHS_{100}$ and $KV_{40}$ should be minimized for optimum fuel economy while the $KV_{100}$ should be kept at >6.9 cSt.

Moreover, the thickening efficiency at a given $HTHS_{150}$ should be increased to reduce the treat rate of a VI improver. If the thickening efficiency of a VI improver is high than the treat rate is low; i.e. less polymer is needed to reach the targeted $HTHS_{150}$ value.

This leads to the following assumptions for an optimum VI improver: It should provide high thickening efficiency at given $HTHS_{150}$ conditions in order to keep the treat rate low, minimum $KV_{40}$ and $HTHS_{100}$ in order to achieve the best fuel economy results whereby the $KV_{100}$ should be well above the value as required by the J300 specifications.

Typically, when VI improvers for excellent fuel economy performance are developed, the $HTHS_{100}$ value is minimized, e.g. in a 0W20 formulation at a given $HTHS_{150}$ of 2.6 mPas. A typical effect which can be seen in this case is a parallel lowering of the $KV_{100}$ values because the thickening at 100° C. is reduced in a parallel fashion to the lowering of the high temperature high shear (HTHS) thickening at 100° C.

This trend becomes visible in the state of the art e.g. in Table 2 of US 2010/0190671 (see paragraph [0158]). Therein, formulation examples are presented which clearly show that the $HTHS_{100}$ values are increasing with increasing $KV_{100}$ values at a given $HTHS_{150}$ of 2.6 mPas.

TABLE 2

| Polymer according to | $KV_{40}$ [mm²/s] | $KV_{100}$ [mm²/s] | $HTHS_{100}$ [mPas] | CCS-35 [mPas] |
|---|---|---|---|---|
| Example 1 | 27.9 | 6.52 | 4.96 | 4832 |
| Example 2 | 27.5 | 6.51 | 4.83 | 4807 |
| Example 3 | 27.3 | 6.56 | 4.82 | 5028 |
| Example 4 | 26.4 | 6.30 | 4.63 | 4387 |
| Example 5 | 26.2 | 6.34 | 4.68 | 4741 |
| Comparative Example 1 | 39.0 | 8.14 | 5.40 | 5989 |
| Comparative Example 2 | 35.3 | 8.73 | 5.20 | 5678 |
| Comparative Example 3 | 39.7 | 9.19 | 5.37 | 5854 |

This trend is further illustrated by FIG. 1, wherein $HTHS_{100}$ and $KV_{100}$ values of working examples 1 to 5 of US 2010/0190671 are plotted.

Until now, this trend could not be circumvented by for example using different monomers or varying the composition or structure of the VI improver polymer and therefore became a big hurdle in the development of new VI improvers for enhanced fuel economy performance. A second negative side-effect of the reduced thickening at higher temperatures (100-150° C.) was that an increased treat rate had to be used to achieve sufficient thickening at 150° C. ($HTHS_{150}$) although satisfying fuel economy was achieved. Increasing the polymer treat rate has a negative impact on commercial aspects like the treat costs or technical aspects, e.g. increased deposit forming tendency, and therefore is a second important performance criteria in modern fuel economy engine oils.

BRIEF SUMMARY OF THE INVENTION

It was now surprisingly found that an increase in the number-average molecular weight $M_n$ has a greater influence on the performance ($KV_{100}$, $HTHS_{100}$) of a polyalkyl (meth)acrylate based comb polymer than a high $M_w$ has; i.e. the preparation of polymers with only a high $M_w$ does not lead to the desired effect. That means that the performance of a polymer with a given composition can be improved by raising $M_n$.

If only $M_w$ would have been raised a completely different GPC spectrum is obtained, instead of a shift of the peak maximum towards higher molecular weight in this case mainly a broadening of the molecular weight distribution is obtained. The shift in peak maximum for the inventive examples is illustrated by FIG. 2.

The correlation between $M_w$ and $M_n$ is generally defined by the polydispersity D which is calculated by the ration of $M_w$ to $M_n$. Usually, with higher $M_w$ the distribution D is becoming broader as well.

It was now found that for PAMA based comb polymers with a number-average molecular weight $M_n$ of at least 130.000 g/mol the thickening efficiency raises with increasing $M_w$ while at the same time $HTHS_{100}$ decreases (e.g. for a given $HTHS_{150}$ of 2.6 mPas).

In order to predict the performance of a PAMA based comb polymer the number-average molecular weight has to be weighted more strongly than the weight-average molecular weight.

For example, a polymer having a very high $M_w$ and moderate $M_n$ gives a similar HTHS result as a polymer with a moderate $M_w$ but very high $M_n$. Therefore, $M_n$ should be rated in a higher potency than $M_w$ to achieve an improved correlation with the HTHS performance of the combs.

To predict the performance of a comb polymer in a lubricating oil formulation a new "weighted" D is introduced as variable "P" and to account for the correlation between D and $M_w$ it was developed a new formula.

The present invention used an empirical approach to better illustrate the relationship and it was found that by applying a factor for $M_w$ which is below 1 (0.8) those number-average molecular weights can be predicted which lead to the best performance advantage for a modified PAMA based comb polymer:

$$P = \frac{M_w^{-0.8}}{M_n} \times 10^{10} < 1 \to M_n > M_w^{-0.8} \times 10^{10}$$

DETAILED DESCRIPTION OF THE INVENTION

Figure 1:
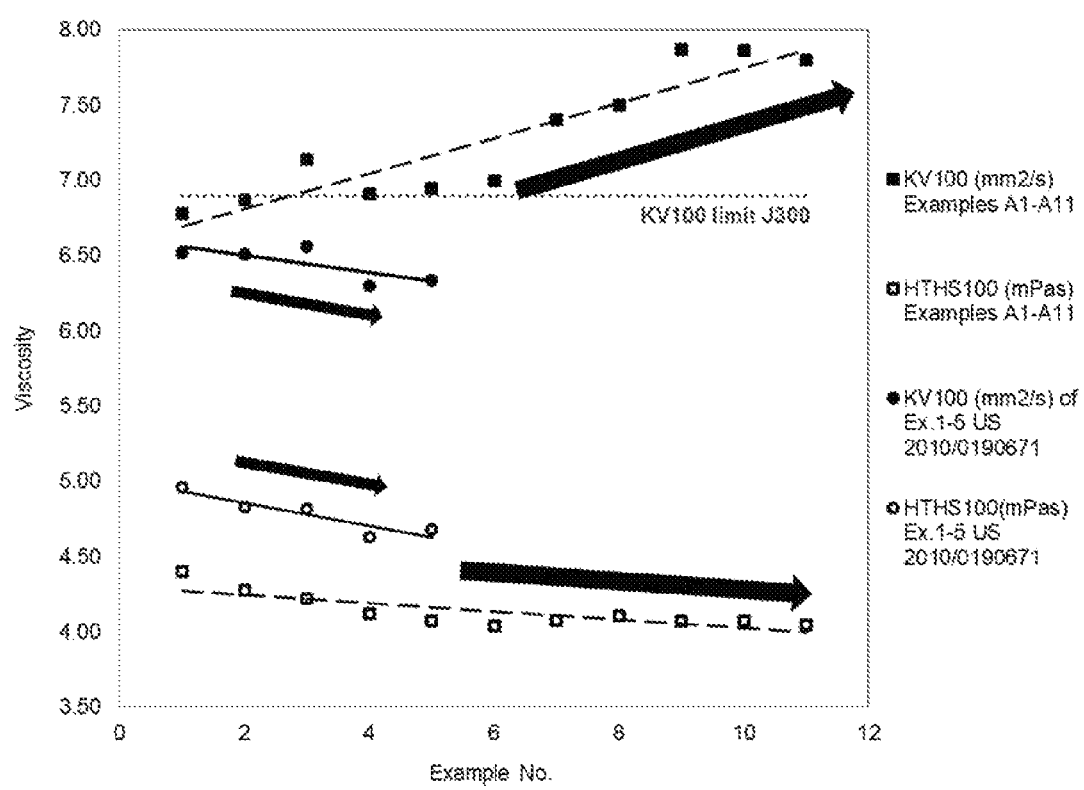
FIG. 1: Trends of the kinematic viscosity (KV) versus high-temperature high-shear viscosity (HTHS) at 100° C. in working examples 1 to 5 of state of the art document US 2010/0190671 versus working examples of the present invention.

Any ranges mentioned herein below include all values and subvalues between the lowest and highest limit of this range as well as the lowest and highest limits themselves.

A first object of the present invention is directed to polyalkyl(meth)acrylate based comb polymers, which are characterized by a weight-average molecular weight M$_w$ of 700.000 g/mol or greater and a number-average molecular weight M$_n$ of 130.000 g/mol or greater.

The weight-average molecular weight of the polyalkyl (meth)acrylate based comb polymers according to the present invention is preferably in the range of 700.000 to 2.000.000 g/mol, more preferably in the range of 700.000 to 1.700.000 g/mol and especially preferred in the range of 700.000 to 1.300.000 g/mol and the number-average molecular weight of the polyalkyl(meth)acrylate based comb polymers according to the present invention is preferably in the range of 130.000 to 300.000 g/mol, more preferably in the range of 130.000 to 220.000 g/mol and especially preferred in the range of 150.000 to 200.000 g/mol.

The polyalkyl(meth)acrylate based comb polymers according to the present invention are further characterized by a value P of 2 or lower, preferably 1.5 or lower and even more preferably between 0.5 and 1.5.

The value P is defined as mentioned further above:

$$P = \frac{M_w^{-0.8}}{M_n} \times 10^{10} \leq 2,$$

preferably $\leq 1.5$ and even more preferably $= 0.5$ to $1.5$

Preferably, the polyalkyl(meth)acrylate based comb polymers according to the present invention have a polydipersity index (D) M$_w$/M$_n$ in the range of 3 to 10, more preferably in the range of 4 to 9. M$_w$ and M$_n$ are determined by size exclusion chromatography (SEC) using commercially available polymethylmethacrylate standards. The determination is effected by gel permeation chromatography with THF as eluent.

A preferred first object of the present invention is directed to polyalkyl(meth)acrylate based comb polymers as mentioned further above, comprising:
 (a) 10 to 30% by weight of an ester of (meth)acrylic acid and a hydroxylated hydrogenated polybutadiene;
 (b) 50% to 80% by weight of C$_{1-4}$ alkyl (meth)acrylates;
 (c) 5% to 20% by weight of C$_{10-30}$ alkyl (meth)acrylates, preferably C$_{10-15}$ alkyl methacrylates, more preferably C$_{12-14}$ alkyl methacrylates; and
 (d) 0% to 15% by weight of further comonomers.

The content of each component (a), (b), (c) and (d) is based on the total composition of the polyalkyl(meth)acrylate based comb polymer.

In a particular embodiment, the proportions of components (a), (b), (c) and (d) add up to 100% by weight.

A comb polymer in the context of this invention comprises a first polymer, which is also referred to as backbone or main chain, and a multitude of further polymers which are referred to as side chains and are bonded covalently to the backbone. In the present case, the backbone of the comb polymer is formed by the interlinked unsaturated groups of the mentioned (meth)acrylates. The ester groups of the (meth)acrylic esters, the phenyl radicals of the styrene monomers and the substituents of the further free-radically polymerizable comonomers form the side chains of the comb polymer.

The term "acrylate" refers to esters of acrylic acid; the term "methacrylate" refers to esters of methacrylic acid; and the term "(meth)acrylate" refers to both, esters of acrylic acid and esters of methacrylic acid.

The hydroxylated hydrogenated polybutadiene for use in accordance with the invention has a number-average molar mass M$_n$ of 4.000 to 6.000 g/mol, preferably 4.500 to 5.000 g/mol. Because of their high molar mass, the hydroxylated hydrogenated polybutadienes can also be referred to as macroalcohols in the context of this invention.

The number-average molar mass M$_n$ is determined by size exclusion chromatography using commercially available polybutadiene standards. The determination is effected to DIN 55672-1 by gel permeation chromatography with THF as eluent.

Preferably, the hydroxylated hydrogenated polybutadiene has a hydrogenation level of at least 99%. An alternative measure of the hydrogenation level which can be determined on the copolymer of the invention is the iodine number. The iodine number refers to the number of grams of iodine which can be added onto 100 g of copolymer. Preferably, the copolymer of the invention has an iodine number of not more than 5 g of iodine per 100 g of copolymer. The iodine number is determined by the Wijs method according to DIN 53241-1:1995-05.

Preferred hydroxylated hydrogenated polybutadienes can be obtained according to GB 2270317.

Some hydroxylated hydrogenated polybutadienes are also commercially available. The commercially hydroxylated hydrogenated polybutadienes include, for example, a hydrogenated polybutadiene OH-functionalized to an extent of about 98% by weight (also called olefin copolymer OCP) having about 50% each of 1,2 repeat units and 1,4 repeat units, of M$_n$=4200 g/mol, from Cray Valley (Paris), a daughter company of Total (Paris).

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with ethylene oxide or propylene oxide, a hydroxy-functionalized polybutadiene can be prepared. This hydroxylated polybutadiene can be hydrogenated in the presence of a suitable transition metal catalyst.

The esters of (meth)acrylic acid for use in accordance with the invention and a hydroxylated hydrogenated polybutadiene described are also referred to as macromonomers in the context of this invention because of their high molar mass.

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth) acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

The $C_{1-4}$ alkyl (meth)acrylates for use in accordance with the invention are esters of (meth)acrylic acid and straight chain or branched alcohols having 1 to 4 carbon atoms. The term "$C_{1-4}$ alkyl methacrylates" encompasses individual (meth)acrylic esters with an alcohol of a particular length, and likewise mixtures of (meth)acrylic esters with alcohols of different lengths.

Suitable $C_{1-4}$ alkyl (meth)acrylates include, for example, methyl (meth)acrylate, ethyl (meth)acrylate, n-propyl (meth)acrylate), iso-propyl (meth)acrylate, n-butyl (meth) acrylate, iso-butyl (meth)acrylate and tert-butyl (meth)acrylate. Particularly preferred $C_{1-4}$ alkyl (meth)acrylates are methyl (meth)acrylate and n-butyl (meth)acrylate; methyl methacrylate, n-butyl methacrylate and n-butyl acrylate are especially preferred.

The $C_{10-30}$ alkyl (meth)acrylates for use in accordance with the invention are esters of (meth)acrylic acid and straight chain or branched alcohols having 10 to 30 carbon atoms. The term "$C_{10-30}$ alkyl methacrylates" encompasses individual (meth)acrylic esters with an alcohol of a particular length, and likewise mixtures of (meth)acrylic esters with alcohols of different lengths.

Suitable $C_{10-30}$ alkyl (meth)acrylates include, for example, 2-butyloctyl (meth)acrylate, 2-hexyloctyl (meth) acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth) acrylate, pentadecyl (meth)acrylate, hexadecyl (meth) acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, 2-decyloctadecyl (meth)acrylate, 2-tetradecyloctadecyl (meth)acrylate, nonadecyl (meth)acrylate, eicosyl (meth) acrylate, cetyleicosyl (meth)acrylate, stearyleicosyl (meth) acrylate, docosyl (meth)acrylate and/or eicosyltetratriacontyl (meth)acrylate. 2-decyl-tetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecylocadecyl (meth)acrylate, 1,2-tetradecyl-octadecyl (meth)acrylate and 2-hexadecyl-eicosyl (meth)acrylate.

The $C_{10-15}$ alkyl methacrylates for use in accordance with the invention are esters of methacrylic acid and alcohols having 10 to 15 carbon atoms. The term "$C_{10-15}$ alkyl methacrylates" encompasses individual methacrylic esters with an alcohol of a particular length, and likewise mixtures of methacrylic esters with alcohols of different lengths.

The suitable $C_{10-15}$ alkyl methacrylates include, for example, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate and/ or pentadecyl methacrylate.

Particularly preferred $C_{10-15}$ alkyl methacrylates are methacrylic esters of a linear $C_{12-14}$ alcohol mixture ($C_{12-14}$ alkyl methacrylate).

Comonomers which can be used in accordance with the present invention are selected from the group consisting of styrene monomers having from 8 to 17 carbon atoms, vinyl esters having from 1 to 11 carbon atoms in the acyl group, vinyl ethers having from 1 to 10 carbon atoms in the alcohol group, dispersing oxygen- and nitrogen-functionalized monomers, heterocyclic (meth)acrylates, heterocyclic vinyl compounds and monomers containing a covalently bonded phosphorous atom.

Suitable styrene monomers having from 8 to 17 carbon atoms are selected from the group consisting of styrene, substituted styrenes having an alkyl substituent in the side chain, for example alpha-methylstyrene and alpha-ethylstyrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes; styrene being preferred.

Suitable vinyl esters having from 1 to 11 carbon atoms in the acyl group are selected from the group consisting of vinyl formate, vinyl acetate, vinyl propionate, vinyl butyrate; preferably vinyl esters including from 2 to 9, more preferably from 2 to 5 carbon atoms in the acyl group, wherein the acyl group may be linear or branched.

Suitable vinyl ethers having from 1 to 10 carbon atoms in the alcohol group are selected from the group consisting of vinyl methyl ether, vinyl ethyl ether, vinyl propyl ether, vinyl butyl ether; preferably vinyl ethers including from 1 to 8, more preferably from 1 to 4 carbon atoms in the alcohol group, wherein the alcohol group may be linear or branched.

Suitable monomers which are derived from dispersing oxygen- and nitrogen-functionalized monomers are selected from the group consisting of
aminoalkyl (meth)acrylates, such as N,N-dimethylaminoethyl (meth)acrylate, N,N-dimethylaminopropyl (meth) acrylate, N,N-diethylaminopentyl (meth)acrylate, N,N-dibutylaminohexadecyl (meth)acrylate;
aminoalkyl(meth)acrylamides, such as N,N-dimethylaminopropyl(meth)acrylamide;
hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate;
$C_{1-8}$-alkyloxy-$C_{2-4}$-alkyl (meth)acrylates, such as methoxypropyl (meth)acrylate, methoxy-butyl (meth)acrylate, methoxy heptyl (meth)acrylate, methoxy hexyl (meth)acrylate, methoxy pentyl (meth)acrylate, methoxy octyl (meth) acrylate, ethoxyethyl (meth)acrylate, ethoxypropyl (meth) acrylate, ethoxy-butyl (meth)acrylate, ethoxy heptyl (meth) acrylate, ethoxyhexyl (meth)acrylate, ethoxypentyl (meth) acrylate, ethoxyoctyl (meth)acrylate, proxymethyl (meth)

acrylate, proxyethyl (meth)acrylate, proxypropyl (meth) acrylate, proxybutyl (meth)acrylate, proxyheptyl (meth) acrylate, proxyhexyl (meth)acrylate, proxypentyl (meth) acrylate, proxyoctyl (meth)acrylate, butoxymethyl (meth) acrylate, butoxyethyl (meth)acrylate, butoxypropyl (meth) acrylate, butoxybutyl (meth)acrylate, butoxyheptyl (meth) acrylate, butoxyhexyl (meth)acrylate, butoxypentyl (meth) acrylate and butoxyoctyl (meth)acrylate, ethoxyethyl (meth) acrylate and butoxyethyl (meth)acrylate are being preferred.

Suitable heterocyclic (meth)acrylates are selected form the group consisting of 2-(1-imidazolyl)ethyl (meth)acrylate, 2-(4-morpholinyl)ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

Suitable heterocyclic vinyl compounds are selected from the group consisting of 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

Monomers containing a covalently bonded phosphorous atom are selected from the group consisting of 2-(dimethylphosphato)propyl (meth)acrylate, 2-(ethylenephosphito) propyl (meth)acrylate, dimethylphosphinomethyl (meth) acrylate, dimethylphosphonoethyl (meth)acrylate, diethyl (meth)acryloyl phosphonate, dipropyl(meth)acryloyl phosphate, 2 (dibutylphosphono)ethyl (meth)acrylate, diethylphosphatoethyl (meth)acrylate, 2-(dimethylphosphato)-3-hydroxypropyl (meth)acrylate, 2-(ethylenephosphito)-3-hydroxypropyl (meth)acrylate, 3-(meth)acryloyloxy-2-hydroxypropyl diethyl phosphonate, 3-(meth)acryloyloxy-2-hydroxypropyl dipropyl phosphonate, 3-(dimethylphosphato)-2-hydroxypropyl (meth)acrylate, 3-(ethylenephosphito)-2-hydroxypropyl (meth)acrylate, 2-(meth)acryloyloxy-3-hydroxypropyl diethyl phosphonate, 2-(meth)acryloyloxy-3-hydroxypropyl dipropyl phosphonate and 2 (dibutylphosphono)-3-hydroxypropyl (meth) acrylate.

A second object of the present invention is directed to polyalkyl(meth)acrylate based comb polymers which are characterized by a weight-average molecular weight $M_w$ of 700.000 g/mol or greater and a number-average molecular weight $M_n$ of 130.000 g/mol or greater, comprising:

(a) 10 to 25% by weight of an ester of (meth)acrylic acid and a hydroxylated hydrogenated polybutadiene;
(b) 0% to 5% by weight of $C_{4-18}$ alkyl acrylates;
(c) 0% to 0.3% by weight of methyl methacrylate;
(d) 60% to 75% by weight of n-butyl methacrylate;
(e) 5% to 20% by weight of $C_{10-30}$ alkyl (meth)acrylates, preferably $C_{10-15}$ alkyl methacrylates, more preferably $C_{12-14}$ alkyl methacrylates; and
(f) 0% to 2% by weight of styrene monomers.

A preferred second object of the present invention is directed to polyalkyl(meth)acrylate based comb polymers which are characterized by a weight-average molecular weight $M_w$ of 700.000 g/mol or greater and a number-average molecular weight $M_n$ of 130.000 g/mol or greater, comprising:

(a) 10 to 25% by weight of an ester of (meth)acrylic acid and a hydroxylated hydrogenated polybutadiene;
(b) 0% to 5% by weight of $C_{4-18}$ alkyl acrylates;
(c) 0% to 0.3% by weight of methyl methacrylate;
(d) 65% to 75% by weight of n-butyl methacrylate;
(e) 10% to 15% by weight of $C_{10-30}$ alkyl (meth)acrylates, preferably $C_{10-15}$ alkyl methacrylates, more preferably $C_{12-14}$ alkyl methacrylates; and
(f) 0% to 2% by weight of styrene monomers.

The content of each component (a), (b), (c), (d), (e) and (f) is based on the total composition of the polyalkyl(meth) acrylate based comb polymer.

In a particular embodiment, the proportions of components (a), (b), (c), (d), (e) and (f) add up to 100% by weight.

The $C_{4-18}$ alkyl acrylates for use in accordance with the invention are esters of acrylic acid and alcohols having 4 to 18 carbon atoms. The term "$C_{4-18}$ alkyl acrylates" encompasses individual acrylic esters with an alcohol of a particular length, and likewise mixtures of acrylic esters with alcohols of different lengths.

The suitable $C_{4-18}$ alkyl acrylates include, for example, butyl acrylate, pentyl acrylate, hexyl acrylate, 2-ethylhexyl acrylate, heptyl acrylate, 2-tert-butylheptyl acrylate, octyl acrylate, 3-isopropylheptyl acrylate, nonyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate and/or octadecyl acrylate.

Particularly preferred $C_{4-18}$ alkyl acrylates are butyl acrylate, especially n-butyl acrylate, and acrylic esters of a linear $C_{16-18}$ alcohol mixture ($C_{16-18}$ alkyl acrylate).

The polyalkyl(meth)acrylate based comb polymers for use in accordance with the invention can be characterized on the basis of its molar branching level ("f-branch"). The molar branching level refers to the percentage in mol % of macromonomers (component (a)) used, based on the total molar amount of all the monomers in the monomer composition. The molar amount of the macromonomers used is calculated on the basis of the number-average molar mass $M_n$ of the macromonomers. The calculation of the branching level is described in detail in WO 2007/003238 A1, especially on pages 13 and 14, to which reference is made here explicitly.

The polyalkyl(meth)acrylate based comb polymers in accordance with the invention preferably have a molar degree of branching $f_{branch}$ of 0.1 to 2 mol %, more preferably 0.3 to 1.5 mol % and most preferably 0.5 to 1.0 mol %.

The molar degree of branching $f_{branch}$ is calculated as described in US 2010/0190671 A1 in paragraphs [0060] to [0065].

The polymers according to the present invention are characterized by their contribution to low $KV_{40}$, $HTHS_{80}$ and $HTHS_{100}$ values (e.g. at a given $HTHS_{150}$ of 2.6 mPas) of lubricating oil compositions comprising them.

The polyalkyl(meth)acrylate based comb polymers according to the present invention can therefore be used in all common grades of motor oils having the viscosity characteristics defined in the document SAE J300.

A further object of the present invention is therefore directed to the use of polyalkyl(meth)acrylate based comb polymers according to the present invention to improve the kinematic viscosity and HTHS performance of lubricating oil compositions, especially of engine oil formulations.

A further object of the present invention is directed to a method of improving the kinematic viscosity and HTHS performance of lubricating oil compositions, especially of engine oil formulations, by adding a polyalkyl(meth)acrylate based comb polymers according to the present invention.

A further object of the present invention is directed to the use of polyalkyl(meth)acrylate based comb polymers according to the present invention to increase $KV_{100}$ and in parallel decrease $HTHS_{100}$ and $HTHS_{80}$ of lubricating oil compositions, especially of engine oil formulations (when formulated to a defined $HTHS_{150}$, e.g. for $HTHS_{150}$ of 2.6 mPas for a 0W20 formulation).

A further object of the present invention is directed to a method of increasing $KV_{100}$ and in parallel decreasing $HTHS_{100}$ and $HTHS_{80}$ of lubricating oil compositions, especially of engine oil formulations (when formulated to a defined $HTHS_{150}$, e.g. for $HTHS_{150}$ of 2.6 mPas for a 0W20 formulation), by adding a polyalkyl(meth)acrylate based comb polymers according to the present invention.

A third object of the present invention is directed to an additive composition, comprising:
(A) a base oil, and
(B) a polyalkyl(meth)acrylate based comb polymer, which is characterized by a weight-average molecular weight $M_w$ of 700.000 g/mol or greater and a number-average molecular weight $M_n$ of 130.000 g/mol or greater.

A preferred third object of the present invention is directed to an additive composition as mentioned above, wherein the weight-average molecular weight $M_w$ of the polyalkyl(meth)acrylate based comb polymer is preferably in the range of 700.000 to 2.000.000 g/mol, more preferably in the range of 700.000 to 1.700.000 g/mol, especially preferred in the range of 700.000 to 1.300.000 g/mol and the number-average molecular weight $M_n$ is in the range of 130.000 to 300.000 g/mol, even more preferably in the range of 130.000 to 220.000 g/mol and especially preferred in the range of 150.000 to 200.000 g/mol.

A further preferred third object of the present invention is directed to an additive composition, characterized in that the polyalkyl(meth)acrylate based comb polymer (B) is further characterized by a value P of 2 or lower, preferably 1.5 or lower and even more preferably between 0.5 and 1.5. The value P is defined as mentioned further above:

$$P = \frac{M_w^{-0.8}}{M_n} \times 10^{10} \leq 2,$$

preferably $\leq 1.5$ and even more preferably $= 0.5$ to $1.5$

A further preferred third object of the present invention is directed to an additive composition, characterized in that the polyalkyl(meth)acrylate based comb polymer (B) comprises the following monomers:
(a) 10 to 30% by weight of an ester of (meth)acrylic acid and a hydroxylated hydrogenated polybutadiene;
(b) 50% to 80% by weight of $C_{1-4}$ alkyl (meth)acrylates;
(c) 5% to 20% by weight of $C_{10-30}$ alkyl (meth)acrylates, preferably $C_{10-15}$ alkyl methacrylates, more preferably $C_{12-14}$ alkyl methacrylates; and
(d) 0% to 15% by weight of further comonomers.

The content of each component (A) and (B) is based on the total weight of the additive composition.

In a particular embodiment, the proportions of components (A) and (B) add up to 100% by weight.

The content of each component (a), (b), (c) and (d) is based on the total composition of the polyalkyl(meth)acrylate based comb polymer.

In a particular embodiment, the proportions of components (a), (b), (c) and (d) add up to 100% by weight.

The base oil to be used in the additive composition comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare an additive composition or lubricating composition in accordance with the present invention is preferably in the range of 3 mm²/s to 10 mm²/s, more preferably in the range of 4 mm²/s to 8 mm²/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for engine oil formulations are used base oils of API Group III.

The additive composition of the present invention comprises preferably 60% to 80% by weight, more preferably 70% to 75% by weight, of the base oil (A) and 20% to 40% by weight, more preferably 25% to 30% by weight, of the polyalkyl(meth)acrylate based comb polymer (B), based on the total weight of the additive composition.

A fourth object of the present invention is directed to an additive composition, comprising:
(A) 60 to 80% by weight, preferably 70 to 75% by weight, of a base oil, and
(B) 20 to 40% by weight, preferably 25 to 30% by weight, of a polyalkyl(meth)acrylate based comb polymer, which is characterized by a weight-average molecular weight $M_w$ of 700.000 g/mol or greater and a number-average molecular weight $M_n$ of 130.000 g/mol or greater, comprising the following monomers:

(a) 10 to 25% by weight of an ester of (meth)acrylic acid and a hydroxylated hydrogenated polybutadiene;
(b) 0% to 5% by weight of $C_{4-18}$ alkyl acrylates;
(c) 0% to 0.3% by weight of methyl methacrylate;
(d) 60% to 75% by weight of n-butyl methacrylate;
(e) 5% to 20% by weight of $C_{10-30}$ alkyl (meth)acrylates, preferably $C_{10-15}$ alkyl methacrylates, more preferably $C_{12-14}$ alkyl methacrylates; and
(f) 0% to 2% by weight of styrene monomers.

A preferred fourth object of the present invention is directed to an additive composition as described under the fourth object, characterized in that the polyalkyl(meth)acrylate based comb polymer (B) comprises the following monomers:
(a) 10 to 25% by weight of an ester of (meth)acrylic acid and a hydroxylated hydrogenated polybutadiene;
(b) 0% to 5% by weight of $C_{4-18}$ alkyl acrylates;
(c) 0% to 0.3% by weight of methyl methacrylate;
(d) 65% to 75% by weight of n-butyl methacrylate;
(e) 10% to 15% by weight of $C_{10-30}$ alkyl (meth)acrylates, preferably $C_{10-15}$ alkyl methacrylates, more preferably $C_{12-14}$ alkyl methacrylates; and
(f) 0% to 2% by weight of styrene monomers.

A further preferred fourth object of the present invention is directed to an additive composition as mentioned above, wherein the weight-average molecular weight $M_w$ of the polyalkyl(meth)acrylate based comb polymer is preferably in the range of 700.000 to 2.000.000 g/mol, more preferably in the range of 700.000 to 1.700.000 g/mol, especially preferred in the range of 700.000 to 1.300.000 g/mol and the number-average molecular weight $M_n$ is in the range of 130.000 to 300.000 g/mol, even more preferably in the range of 130.000 to 220.000 g/mol and especially preferred in the range of 150.000 to 200.000 g/mol.

A further preferred fourth object of the present invention is directed to an additive composition, characterized in that the polyalkyl(meth)acrylate based comb polymer (B) is further characterized by a value P of 2 or lower, preferably 1.5 or lower and even more preferably between 0.5 and 1.5. The value P is defined as mentioned further above:

$$P = \frac{M_w^{-0.8}}{M_n} \times 10^{10} \leq 2,$$

preferably $\leq 1.5$ and even more preferably $= 0.5$ to $1.5$

The additive compositions are characterized by their contribution to kinematic viscosity and HTHS performance of lubricating oil compositions.

A further object of the present invention is therefore directed to the use of an additive composition according to the present invention to improve the kinematic viscosity and HTHS performance of lubricating oil compositions, especially of engine oil formulations.

A further object of the present invention is directed to a method of improving the kinematic viscosity and HTHS performance of lubricating oil compositions, especially of engine oil formulations, by adding an additive composition according to the present invention.

A further object of the present invention is directed to the use of an additive composition according to the present invention to increase $KV_{100}$ and in parallel decrease $HTHS_{100}$ of lubricating oil compositions, especially of engine oil formulations (when formulated to a defined $HTHS_{150}$, e.g. for $HTHS_{150}$ of 2.6 mPas for a 0W20 formulation).

A further object of the present invention is directed to a method of increasing $KV_{100}$ and in parallel decreasing $HTHS_{100}$ of lubricating oil compositions, especially of engine oil formulations (when formulated to a defined $HTHS_{150}$, e.g. for $HTHS_{150}$ of 2.6 mPas for a 0W20 formulation), by adding an additive composition according to the present invention.

A fifth object of the present invention is directed to a lubricating oil composition, comprising:
(A) 80 to 99.5% by weight of a base oil;
(B) 0.5 to 5% by weight of a polyalkyl(meth)acrylate based comb polymer, which is characterized by a weight-average molecular weight $M_w$ of 700.000 g/mol or greater and a number-average molecular weight $M_n$ of 130.000 g/mol or greater; and
(C) 0 to 15% by weight of one or more further additives.

A preferred fifth object of the present invention is directed to a lubricating oil composition, wherein the polyalkyl(meth)acrylate based comb polymer (B) comprises:
(a) 10 to 30% by weight of an ester of (meth)acrylic acid and a hydroxylated hydrogenated polybutadiene;
(b) 50% to 80% by weight of $C_{1-4}$ alkyl (meth)acrylates;
(c) 5% to 20% by weight of $C_{10-30}$ alkyl (meth)acrylates, preferably $C_{10-15}$ alkyl methacrylates, more preferably $C_{12-14}$ alkyl methacrylates; and
(d) 0% to 15% by weight of further comonomers.

The content of each component (A), (B) and (C) is based on the total composition of the lubricating oil composition.

In a particular embodiment, the proportions of components (A), (B) and (C) add up to 100% by weight.

The content of each component (a), (b), (c) and (d) is based on the total composition of the polyalkyl(meth)acrylate based comb polymer.

In a particular embodiment, the proportions of components (a), (b), (c) and (d) add up to 100% by weight.

A further preferred fifth object of the present invention is directed to an additive composition as mentioned above, wherein the weight-average molecular weight $M_w$ of the polyalkyl(meth)acrylate based comb polymer is preferably in the range of 700.000 to 2.000.000 g/mol, more preferably in the range of 700.000 to 1.700.000 g/mol, especially preferred in the range of 700.000 to 1.300.000 g/mol and the number-average molecular weight $M_n$ is in the range of 130.000 to 300.000 g/mol, even more preferably in the range of 130.000 to 220.000 g/mol and especially preferred in the range of 150.000 to 200.000 g/mol.

A further preferred fifth object of the present invention is directed to an additive composition, characterized in that the polyalkyl(meth)acrylate based comb polymer (B) is further characterized by a value P of 2 or lower, preferably 1.5 or lower and even more preferably between 0.5 and 1.5. The value P is defined as mentioned further above:

$$P = \frac{M_w^{-0.8}}{M_n} \times 10^{10} \leq 2,$$

preferably $\leq 1.5$ and even more preferably $= 0.5$ to $1.5$

A sixth object of the present invention is directed to a lubricating oil composition, comprising:
(A) 80 to 99.5% by weight of a base oil;
(B) 0.5 to 5% by weight of a polyalkyl(meth)acrylate based comb polymer, which is characterized by a weight-average molecular weight $M_w$ of 700.000 g/mol or greater and a number-average molecular weight $M_n$ of 130.000 g/mol or greater, comprising the following monomers:
   (a) 10 to 25% by weight of an ester of (meth)acrylic acid and a hydroxylated hydrogenated polybutadiene;
   (b) 0% to 5% by weight of $C_{4-18}$ alkyl acrylates;
   (c) 0% to 0.3% by weight of methyl methacrylate;
   (d) 60% to 75% by weight of n-butyl methacrylate;
   (e) 5% to 20% by weight of $C_{10-30}$ alkyl (meth) acrylates, preferably $C_{10-15}$ alkyl methacrylates, more preferably $C_{12-14}$ alkyl methacrylates; and
   (f) 0% to 2% by weight of styrene monomers; and
(C) 0 to 15% by weight of one or more further additives.

A preferred sixth object of the present invention is directed to a lubricating oil composition, wherein the polyalkyl(meth)acrylate based comb polymer (B) comprises:
   (a) 10 to 25% by weight of an ester of (meth)acrylic acid and a hydroxylated hydrogenated polybutadiene;
   (b) 0% to 5% by weight of $C_{4-18}$ alkyl acrylates;
   (c) 0% to 0.3% by weight of methyl methacrylate;
   (d) 65% to 75% by weight of n-butyl methacrylate;
   (e) 10% to 15% by weight of $C_{10-30}$ alkyl (meth)acrylates, preferably $C_{10-15}$ alkyl methacrylates, more preferably $C_{12-14}$ alkyl methacrylates; and
   (f) 0% to 2% by weight of styrene monomers.

A further preferred sixth object of the present invention is directed to a lubricating oil composition as mentioned above, wherein the weight-average molecular weight $M_w$ of the polyalkyl(meth)acrylate based comb polymer is preferably in the range of 700.000 to 2.000.000 g/mol, more preferably in the range of 700.000 to 1.700.000 g/mol, especially preferred in the range of 700.000 to 1.300.000 g/mol and the number-average molecular weight $M_n$ is in the range of 130.000 to 300.000 g/mol, even more preferably in the range of 130.000 to 220.000 g/mol and especially preferred in the range of 150.000 to 200.000 g/mol.

A further preferred sixth object of the present invention is directed to a lubricating oil composition as mentioned above, characterized in that the polyalkyl(meth)acrylate based comb polymer (B) is further characterized by a value P of 2 or lower, preferably 1.5 or lower and even more preferably between 0.5 and 1.5.

The value P is defined as mentioned further above:

$$P = \frac{M_w^{-0.8}}{M_n} \times 10^{10} \leq 2,$$

preferably $\leq 1.5$ and even more preferably $= 0.5$ to $1.5$

The lubricating oil compositions according to the present invention are characterized by their low $KV_{40}$ and high $KV_{100}$ values, determined to ASTM D445, their low $HTHS_{80}$ and $HTHS_{100}$ values, determined to CEC L-036 and their low treat rate.

When formulated to a given $HTHS_{150}$ target of 2.6 mPas for a 0W20 formulation according to SAE J300, the lubricating oil formulations of the present invention show $KV_{40}$ values in the range of 22 to 24 $mm^2/s$ (when formulated without DI package) and in the range of 7.5 to 8.5 $mm^2/s$ (when formulated with DI package).

When formulated to a given $HTHS_{150}$ target of 2.6 mPas for a 0W20 formulation according to SAE J300, the lubricating oil formulations of the present invention show $HTHS_{80}$ values in the range of 5.9 to 6.0 mPas and $HTHS_{100}$ values in the range of 4.0 to 4.2 mPas (when formulated without DI package).

When formulated to a given $HTHS_{150}$ target of 2.6 mPas for a 0W20 formulation according to SAE J300, the lubricating oil formulations of the present invention show $HTHS_{80}$ values in the range of 7.0 to 7.5 mPas and $HTHS_{100}$ values in the range of 4.8 to 5.2 mPas (when formulated with DI package).

The $KV_{100}$ values are >6.9 mPas as defined by the J300 specification.

The lubricating oil compositions according to the present invention are further characterized by a high viscosity index (VI). The VI is at least 245, preferably in the range of 245 to 350, more preferably in the range of 250 to 310.

The concentration of the polyalkyl(meth)acrylate polymer (B) in the lubricating oil composition is preferably in the range of 1 to 4% by weight, based on the total weight of the lubricating oil composition.

Preferably, the total concentration of the one or more additives (C) is 0.05% to 15% by weight, more preferably 3% to 10% by weight, based on the total weight of the lubricating oil composition.

Further preferred contents of components (A), (B) and (C) in the lubricating oil compositions according to the present invention are as detailed in the following table:

| Lubricating Oil Composition | Component (A) [% by weight] | Component (B) [% by weight] | Component (C) [% by weight] |
|---|---|---|---|
| (1) | 80 to 99.45 | 0.5 to 5 | 0.05 to 15 |
| (2) | 85 to 96.5 | 0.5 to 5 | 3 to 10 |
| (3) | 81 to 99 | 1 to 4 | 0 to 15 |
| (4) | 81 to 98.95 | 1 to 4 | 0.05 to 15 |
| (5) | 86 to 96 | 1 to 4 | 3 to 10 |

In a particular embodiment, the proportions of components (A), (B) and (C) add up to 100% by weight.

Component (A) can be described as mentioned further above under the first object, the preferred first object, the second object and the preferred second object.

The lubricating oil composition according to the invention may also contain, as component (C), further additives selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

Conventional VI improvers include hydrogenated styrene-diene copolymers (HSDs, U.S. Pat. Nos. 4,116,917, 3,772,196 and 4,788,316), especially based on butadiene and isoprene, and also olefin copolymers (OCPs, K. Marsden: "Literature Review of OCP Viscosity Modifiers", Lubrication Science 1 (1988), 265), especially of the poly(ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Röhm and Haas, WO 2006/007934 to RohMax Additives).

Compilations of VI improvers and pour point improvers for lubricant oils, especially motor oils, are detailed, for example, in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London 1992; or J. Bartz: "Additive für Schmierstoffe", Expert-Verlag, Renningen-Malmsheim 1994.

Appropriate dispersants include poly-(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butyl idenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyi-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, alpha-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricating oil composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight of from 5.000 to 50.000 g/mol.

The amount of the pour point depressant is preferably from 0.1 to 5% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricating oil composition.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Friction modifiers may be used in an amount of 0 to 6% by weight, preferably 0.05 to 4% by weight, more preferably 0.1 to 2% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

The polyalkyl(meth)acrylate based comb polymers in accordance with the invention can in general be prepared by free-radical polymerization and by related methods of controlled free-radical polymerization, for example ATRP (=atom transfer radical polymerization) or RAFT (=reversible addition fragmentation chain transfer).

Standard free-radical polymerization is detailed, inter alia, in Ullmann's Encyclopedia of Industrial Chemistry, Sixth Edition. In general, a polymerization initiator and optionally a chain transfer agent are used for this purpose.

The ATRP method is known per se. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polyalkyl(meth)acrylate based comb polymers according to the present invention with the molecular weights as defined further above are accessible using a more specified process.

A seventh object of the present invention is therefore directed to a process for preparing the polyalkyl(meth) acrylate based comb polymers as specified further above under the first and second embodiment, the process comprising the steps of:

(a) preparing a reaction mixture comprising monomers and dilution oil 1, wherein the monomers are present in an amount of 40 to 65% by weight, preferably 40 to 50% by weight;

(b) heating 50% of the reaction mixture prepared under step (a) to a temperature in the range of 80 to 120° C., preferably 90 to 100° C.;

(c) adding 0.05 to 0.1%, based on the total amount of the monomers, of an initiator 1 to the reaction mixture as prepared under step (b), the initiator having a half-life $T_{1/2}$ in the range of 100 to 200 minutes, preferably 150 to 170 minutes, at the given temperature according to step (b);

(d) adding further amounts of the reaction mixture prepared under (a) and further 0.05 to 0.1% of initiator 1 during a time of 2 to 4 hours, preferably during 3 h;

(e) maintaining the reaction mixture prepared under step (d) for a time of 0.5 to 3 hours, preferably 2 hours, at the given temperature;

(f) diluting the reaction mixture prepared under step (e) during a time of 0.5 to 3 hours to 30% with dilution oil 2 comprising further amounts of initiator 1;

(g) optionally adding further amounts of an initiator 1 or an initiator 2, which can be the same or different than initiator 1, to the reaction mixture prepared under step (e) and maintain for at least 2 hours; and (h) diluting the reaction mixture prepared under step (g) to the targeted concentration by addition of dilution oil 1 or a dilution oil 2, which can be the same or different than dilution oil 1.

The initiator concentration and initiator addition is selected such that the $M_n$ and $M_w$ of the resulting polymer stays approximately constant during the main part of the polymerization reaction and good monomer conversion is achieved.

Initiator 1 and 2 may be the same or different and are independently selected from the group consisting of azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, initiator 1 and 2 are independently selected from the group consisting of 2,2'-azobis(2-methylbutyronitrile), tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Especially preferred 1,1-di-tert-butylperoxy-3,3,5-trimethylcyclohexan is used as initiator 1 and tert-butylperoxy 2-ethylhexanoate or 1,1-di-tert-butylperoxy-3,3,5-trimethylcyclohexan as initiator 2.

The targeted concentration may be in the range of 20 to 30% and is preferably 25%.

Dilution oil 1 and 2 may be the same or different and are independently be selected from the group consisting of API Group I, III, III, IV, V and mixtures thereof. They are preferably selected from API Group III oils and mixtures thereof.

The monomers which can be used are selected from the embodiments as defined further above.

The reaction temperature mentioned in step (b) has to be carefully balanced between in-process viscosity and polymerization rate.

The invention is partly illustrated by the enclosed Figures.

The invention has been further illustrated by the following non-limiting examples.

EXPERIMENTAL PART

Abbreviations

AA alkyl acrylate
$C_4$ AA $C_4$-alkyl acrylate=n-butyl acrylate
$C_{16/18}$ AA $C_{16/18}$-alkyl acrylate
AMA alkyl methacrylate
$C_1$ AMA $C_1$-alkyl methacrylate=methyl methacrylate (MMA)
$C_4$ AMA $C_4$-alkyl methacrylate=n-butyl methacrylate
$C_{12-15}$ AMA $C_{12-15}$-alkyl methacrylate
DDM dodecanethiol
$HTHS_{80}$ high-temperature high-shear viscosity @80° C., measured according to CEC L-036
$HTHS_{100}$ high-temperature high-shear viscosity @100° C., measured according to CEC L-036
$HTHS_{150}$ high-temperature high-shear viscosity @150° C., measured according to CEC L-036
KV kinematic viscosity measured according to ASTM D445
$KV_{40}$ kinematic viscosity @40° C., measured according to ISO 3104
$KV_{100}$ kinematic viscosity @100° C., measured according to ISO 3104
MM macromonomer
$M_n$ number-average molecular weight
$M_w$ weight-average molecular weight
NB 3020 Nexbase® 3020, Group III base oil from Neste with a $KV_{100}$ of 2.2 cSt
NB 3043 Nexbase® 3043, Group III base oil from Neste with a $KV_{100}$ of 4.3 cSt
OLOA 55501 DI Package for PCMO commercially available from Oronite
PCMO Passenger car motor oils
D Polydispersity index
VI viscosity index, measured according to ISO 2909
Yubase 4 Group III base oil from SK Lubricants with a $KV_{100}$ of 4.2 cSt
Test Methods The comb polymers according to the present invention and the comparative examples were characterized with respect to their molecular weight and PDI.

Molecular weights were determined by size exclusion chromatography (SEC) using commercially available polymethylmethacrylate (PMMA) standards. The determination is effected by gel permeation chromatography with THF as eluent (flow rate: 1 mL/min; injected volume: 100 µl).

The additive compositions including the comb polymers according to the present invention and comparative examples were characterized with respect to their viscosity index (VI) to ASTM D 2270, kinematic viscosity at 40° C. ($KV_{40}$) and 100° C. ($KV_{100}$) to ASTM D445 and with respect to their shear stability.

To show the shear stability of the additive compositions, the PSSI (Permanent Shear Stability Index) was calculated according to ASTM D 6022-01 (Standard Practice for Calculation of Permanent Shear Stability Index) based on data measured according to ASTM D 2603-B (Standard Test Method for Sonic Shear Stability of Polymer-Containing Oils).

The lubricating oil compositions including the comb polymers according to the present invention and comparative examples were characterized with respect to kinematic viscosity at 40° C. ($KV_{40}$) and 100° C. ($KV_{100}$) to ASTM D445, the viscosity index (VI) to ASTM D 2270, high-temperature high-shear viscosity at 80° C., 100° C. and 150° C. to CEC L-036, Noack evaporation loss at 250° C. for 1 hour to CEC L-40B and CCS (Cold-Cranking Simulator) apparent viscosity at −35° C. to ASTM D 5293.

Synthesis of a Hydroxylated Hydrogenated Polybutadiene

The macroalcohol prepared was a hydroxypropyl-terminated hydrogenated polybutadiene having a mean molar mass $M_n$=4750 g/mol.

The macroalcohol was synthesized by an anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and pressure 200 bar. After the hydrogenation had ended, the noble metal catalyst was removed and organic solvent was drawn off under reduced pressure. Finally, the base oil NB 3020 was used for dilution to a polymer content of 70% by weight.

The vinyl content of the macroalcohol was 61%, the hydrogenation level>99% and the OH functionality>98%. These values were determined by H-NMR (nuclear resonance spectroscopy).

Synthesis of Macromonomer (MM)

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol were dissolved in 450 g of methyl methacrylate (MMA) by stirring at 60° C. Added to the solution were 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 g of MMA were distilled off for azeotropic drying. After cooling to 95° C., 0.30 g of $LiOCH_3$ was added and the mixture was heated back to reflux. After the reaction time of about 1 hour, the top temperature had fallen to −64° C. because of methanol formation. The methanol/MMA azeotrope formed was distilled off constantly until a constant top temperature of about 100° C. was established again. At this temperature, the mixture was left to react for a further hour. For further workup, the bulk of MMA was drawn off under reduced pressure. Insoluble catalyst residues were removed by pressure filtration (Seitz T1000 depth filter). The content of NB 3020 "entrained" into the copolymer syntheses described further down was taken into account accordingly.

Synthesis of Comb Polymers

An apparatus with 4-neck flask and precision glass saber stirrer was initially charged with 50% of monomer-oil mixture (175 g of monomer mixture and 262.5 g of oil mixture). After heating to 96° C. under nitrogen, 0.15% by weight of 1,1-di-tert-butylperoxy-3,3,5-trimethylcyclohexan (I-3) (50% in isododecane) was added and the temperature is maintained. Another 50% of the monomer-oil mixture and 0.2% 1,1-di-tert-butylperoxy-3,3,5-trimethylcyclohexan (I-3) (50% in isododecane) was added within 3 hours. Then the reaction was maintained at 96° C. for another 2 h. Subsequently, the reaction mixture was diluted to 30% solids with NB 3043 and 0.2% 1,1-di-tert-butylperoxy-3,3,5-trimethylcyclohexan (I-3) (50% in isododecane) within 3 hours. Then the reaction was maintained at 96° C.

for another 2 h and after this another 0.2% 1,1-di-tert-butylperoxy-3,3,5-trimethylcyclohexan (I-3) (50% in isododecane) was added and the mixture was stirred at 96° C. overnight. The next day, the mixture was diluted to 25% solids with NB 3043. 700 g of a 25% solution of comb polymers in mineral oil were obtained. The monomer components added up to 100%. The amounts of initiator and dilution oil were given relative to the total amount of monomers. Details regarding the monomer mixtures are given in Table 1 below.

Process Details

The conventional polymerization of comb polymers is performed at 90 to 95° C. with I-1 as initiator (see Table 1; I-1=commercially available tert-butylperoxy 2-ethylhexanoate). In this temperature range the half-life of I-1 is between 40-70 minutes. Depending on the composition of the polymer this process typically leads to weight-average molecular weights $M_w$ in the range of 300.000 g/mol and 500.000 g/mol while compositions with higher degree of branching lead to higher $M_w$.

In the new process described in this document the polymerization of comb polymers was performed at temperatures that correspond to a much higher half-life of the Initiator of 150 to 170 minutes. Different initiators and polymerization temperatures were tested, always keeping the half-life of the initiator at 150 to 170 minutes (please find examples in Table 1 below). For example, for I-1 such conditions can be obtained at 83° C. At the same time it was found that higher polymerization temperatures lead to lower in-process viscosities and easier handling of the polymerization and therefore initiators with higher decay temperatures are preferred in this new process. For example, I-3 exhibits a half-life of 196 minutes at 96° C. and can be polymerized at very low in-process viscosities.

Comb polymers with significantly increased molecular weight ($M_w$ and $M_n$) can be obtained by using the new process, which were not accessible before.

TABLE 1

Initiators and their polymerization temperatures at half-lifes between 150 and 170° C. as used in the new process in comparison to the typical half-life and polymerization temperature of I-1.

| Initiator | Chemical name | Commercial name | T [° C.] | $t_{1/2}$ [min] |
|---|---|---|---|---|
| I-1 | tert-butylperoxy 2-ethylhexanoate | | 95 | 40 |
| | | | 83 | 156 |
| I-2 | 2,2'-azobis(2-methylbutyronitrile) (AMBN) | Vazo ™ 67 | 76 | 163 |
| I-3 | 1,1-di-tert-butylperoxy-3,3,5-trimethylcyclohexan | Trigonox ® 29 | 96 | 169 |
| I-4 | tert-butyl peroxybenzoate | Trigonox ® C | 113 | 166 |
| I-5 | tert-butylperoxy-3,5,5-trimethylhexanoat | Trigonox ® 42S, TBPIN | 105 | 166 |

Table 2 shows the reaction mixtures used to prepare working examples and comparative examples as well as the initiator used, the overall concentration of the initiator and the process details, i.e. concentration of reaction mixture and polymerization temperature.

The monomer components add up to 100%. The amount of initiator is given relative to the total amount of monomers. At the end of the reaction, the resulting reaction mixture was diluted to a polymer content of 25%. The remaining amount (about 75%) was dilution oil as described above in the general proceedings used to prepare the polymers.

TABLE 2

Reaction mixtures used to prepare working examples and comparative examples.

| | Monomers (25% of final reaction mixture) | | | | | | | Process Details | |
|---|---|---|---|---|---|---|---|---|---|
| | | $C_{12-15}$ | $C_{16/18}$ | $C_4$ | $C_1$ | $C_4$ | | | |
| Example # | MM [%] | AMA [%] | AA [%] | AA [%] | AMA [%] | AMA [%] | Styrene [%] | Initiator [%] | Conc.**)/ Temp. |
| A1*) | 14 | 13 | 1.9 | 1.9 | 0.2 | 68.5 | 0.2 | 0.2 I-1 | 67%/ 95° C. |
| A2*) | 14 | 13 | 1.9 | 1.9 | 0.2 | 68.5 | 0.2 | 0.2 I-4 | 40%/ 113° C. |
| A3*) | 14 | 13 | 1.9 | 1.9 | 0.2 | 68.5 | 0.2 | 0.15/0.2 I-1 | 50%/ 96° C. |
| A4*) | 14 | 13 | 1.9 | 1.9 | 0.2 | 68.5 | 0.2 | 0.15/0.2 I-2 | 50%/ 84° C. |
| A5*) | 14 | 13 | 1.9 | 1.9 | 0.2 | 68.5 | 0.2 | 0.15/0.2 I-2 | 50%/ 80° C. |
| A6 | 14 | 13 | 1.9 | 1.9 | 0.2 | 68.5 | 0.2 | 0.15/0.2 I-1 | 50%/ 83° C. |
| A7 | 14 | 13 | 1.9 | 1.9 | 0.2 | 68.5 | 0.2 | 0.15/0.2 I-3 | 40%/ 96° C. |
| A8 | 14 | 13 | 1.9 | 1.9 | 0.2 | 68.5 | 0.2 | 0.15/0.2 I-5 | 50%/ 105° C. |
| A9 | 14 | 13 | 1.9 | 1.9 | 0.2 | 68.5 | 0.2 | 0.15/0.2 I-3 | 50%/ 96° C. |
| A10 | 14 | 13 | 1.9 | 1.9 | 0.2 | 68.5 | 0.2 | 0.15/0.2 I-3 | 50%/ 96° C. |
| A11 | 14 | 13 | 1.9 | 1.9 | 0.2 | 68.5 | 0.2 | 0.15/0.2 I-3 | 50%/ 96° C. |
| A12 | 14 | 15.2 | — | 1.9 | 0.2 | 68.5 | 0.2 | 0.2/0.15 I-3 | 40%/ 96° C. |
| A13*) | 25 | 11 | — | — | — | 64 | — | 0.2/0.2 I-1 | 50%/ 95° C. |
| A14*) | 25 | 11 | — | — | — | 64 | — | 0.15/0.2 I-1 | 60%/ 95° C. |

TABLE 2-continued

Reaction mixtures used to prepare working examples and comparative examples.

| | Monomers (25% of final reaction mixture) | | | | | | Process Details | |
|---|---|---|---|---|---|---|---|---|
| | $C_{12-15}$ | $C_{16/18}$ | $C_4$ | $C_1$ | $C_4$ | | | |
| Example # | MM [%] | AMA [%] | AA [%] | AA [%] | AMA [%] | AMA [%] | Styrene [%] | Initiator [%] | Conc.**)/ Temp. |
| A15*) | 25 | 11 | — | — | — | 64 | — | 0.15/0.2 I-3 | 40%/ 96° C. |
| A16*) | 25 | 11 | — | — | — | 64 | — | 0.15/0.2 I-3 | 50%/ 96° C. |
| A17 | 25 | 11 | — | — | — | 64 | — | 0.15/0.2 I-3 | 50%/ 96° C. |
| A18 | 25 | 11 | — | — | — | 64 | — | 0.15/0.2 I-3 | 60%/ 96° C. |
| A19 | 25 | 11 | — | — | — | 64 | — | 0.15/0.2 I-3 | 65%/ 96° C. |
| A20*) | 12 | 5 | — | — | — | 83 | — | 0.15/0.2 I-3 | 60%/ 96° C. |
| A21*) | 12 | 5 | — | — | — | 83 | — | 0.15/0.2 I-3 | 50%/ 96° C. |
| A22*) | 12 | 5 | — | — | — | 83 | — | 0.15/0.2 I-3 | 55%/ 96° C. |
| A23*) | 15 | 15 | — | — | 0.2 | 69.6 | 0.2 | 0.2/0.2 I-1 | 50%/ 95° C. |
| A24*) | 14 | 15.2 | — | — | 0.2 | 70.4 | 0.2 | 0.15/0.2 I-3 | 40%/ 96° C. |
| A25 | 14 | 15.2 | — | — | 0.2 | 70.4 | 0.2 | 0.15/0.2 I-3 | 40%/ 96° C. |
| A26 | 15 | 15.2 | — | — | 0.2 | 69.4 | 0.2 | 0.15/0.2 I-3 | 50%/ 96° C. |

*) comparative example
**) starting concentration of monomer mixture

The net compositions of the resulting comb polymers as well as their characteristic weight-average molecular weights $M_w$, number-average molecular weights $M_n$, their polydispersity indices (D) and the resulting P-factor are summarized in the following Table 3.

Table 3 further shows the macromonomer conversion rate $MM_{conv.}$ and the molar degree of branching $f_{branch}$ of the resulting comb polymers.

Examples A1-A5, A13-A16 and A20-A24 are comparative examples wherein $M_w$ and $M_n$ are below the claimed ranges. Examples A6-A12, A17-A19 and A25 are in accordance with the present invention and comprise polyalkyl (meth)acrylate based comb polymers having $M_w$ and $M_n$ within the defined ranges.

TABLE 3

Net compositions of the comb polymers prepared according to the present invention.

| | | | Monomers in net composition | | | | | | | Characteristics | | | |
|---|---|---|---|---|---|---|---|---|---|---|---|---|---|
| | | | $C_{12-15}$ | $C_{16/18}$ | $C_4$ | $C_1$ | $C_4$ | | | | | | |
| Example # | $MM_{conv.}$ [%] | $f_{branch}$ | MM [%] | AMA [%] | AA [%] | AA [%] | AMA [%] | AMA [%] | Styrene [%] | $M_n$ [g/mol] | $M_w$ [g/mol] | D | P |
| A1*) | 91 | 0.5 | 12.8 | 13.2 | 1.9 | 1.9 | 0.2 | 69.8 | 0.2 | 62.000 | 336.000 | 5.4 | 6.1 |
| | | | | | | | | | | 79.000 | 214.000 | 2.7 | 6.9 |
| A2*) | 87 | 0.5 | 12.1 | 13.3 | 1.9 | 1.9 | 0.2 | 70.3 | 0.2 | 113.000 | 461.000 | 4.1 | 2.6 |
| A3*) | 90 | 0.5 | 12.6 | 13.3 | 1.9 | 1.9 | 0.2 | 69.9 | 0.2 | 120.000 | 614.000 | 5.1 | 2.0 |
| A4*) | 93 | 0.5 | 13 | 13.2 | 2 | 1.9 | 0.2 | 69.5 | 0.2 | 149.000 | 574.000 | 3.9 | 1.7 |
| A5*) | 92 | 0.5 | 12.9 | 13.2 | 1.9 | 1.9 | 0.2 | 69.7 | 0.2 | 163.000 | 622.000 | 3.8 | 1.4 |
| A6 | 92 | 0.5 | 12.9 | 13.2 | 1.9 | 1.9 | 0.2 | 69.7 | 0.2 | 134.000 | 792.000 | 5.9 | 1.4 |
| A7 | 89 | 0.5 | 12.5 | 13.3 | 1.9 | 1.9 | 0.2 | 70 | 0.2 | 187.000 | 939.000 | 5.0 | 0.9 |
| A8 | 87 | 0.5 | 12.2 | 13.3 | 2 | 1.9 | 0.2 | 70.2 | 0.2 | 172.000 | 1.010.000 | 5.9 | 0.9 |
| A9 | 90 | 0.5 | 12.6 | 13.3 | 1.9 | 1.9 | 0.2 | 69.9 | 0.2 | 156.000 | 1.260.000 | 8.1 | 0.8 |
| A10 | 87 | 0.5 | 12.2 | 13.3 | 2 | 1.9 | 0.2 | 70.2 | 0.2 | 163.000 | 1.460.000 | 9.0 | 0.7 |
| A11 | 87 | 0.5 | 12.2 | 13.3 | 2 | 1.9 | 0.2 | 70.2 | 0.2 | 203.000 | 1.590.000 | 7.8 | 0.5 |
| A12 | 87 | 0.5 | 12.4 | 15.5 | — | 1.9 | 0.2 | 69.8 | 0.2 | 133.000 | 782.000 | 5.9 | 1.5 |
| A13*) | 90 | 1.0 | 23.1 | 11.3 | — | — | — | 65.6 | — | 78.900 | 214.000 | 2.7 | 6.9 |
| A14*) | 91 | 1.0 | 23.3 | 11.3 | — | — | — | 65.5 | — | 86.000 | 238.000 | 2.8 | 5.8 |
| A15*) | 87 | 1.0 | 22.5 | 11.4 | — | — | — | 66.1 | — | 115.000 | 539.000 | 4.7 | 2.3 |
| A16*) | 89 | 1.0 | 22.9 | 11.3 | — | — | — | 65.8 | — | 149.000 | 676.000 | 4.5 | 1.5 |
| A17 | 88 | 1.0 | 22.7 | 11.3 | — | — | — | 66.0 | — | 174.000 | 788.000 | 4.5 | 1.1 |
| A18 | 90 | 1.0 | 23.1 | 11.3 | — | — | — | 65.6 | — | 190.000 | 951.000 | 5.0 | 0.9 |
| A19 | 88 | 1.0 | 22.7 | 11.3 | — | — | — | 66.0 | — | 198.000 | 1.280.000 | 6.5 | 0.7 |

TABLE 3-continued

Net compositions of the comb polymers prepared according to the present invention.

| | | | | Monomers in net composition | | | | | | Characteristics | | | |
|---|---|---|---|---|---|---|---|---|---|---|---|---|---|
| | | | | $C_{12-15}$ | $C_{16/18}$ | $C_4$ | $C_1$ | $C_4$ | | | | | |
| Example # | $MM_{conv.}$ [%] | $f_{branch}$ | MM [%] | AMA [%] | AA [%] | AA [%] | AMA [%] | AMA [%] | Styrene [%] | $M_n$ [g/mol] | $M_w$ [g/mol] | D | P |
| A20*) | 89 | 0.4 | 10.8 | 5.1 | — | — | — | 84.1 | — | 77.000 | 204.000 | 2.6 | 7.3 |
| A21*) | 87 | 0.4 | 10.6 | 5.1 | — | — | — | 84.3 | — | 117.000 | 509.000 | 4.4 | 2.3 |
| A22*) | 88 | 0.4 | 10.7 | 5.1 | — | — | — | 84.2 | — | 197.000 | 674.000 | 3.4 | 1.1 |
| A23*) | 90 | 0.5 | 13.7 | 15.2 | — | — | 0.2 | 70.7 | 0.2 | 102.000 | 376.000 | 3.7 | 3.4 |
| A24*) | 87 | 0.5 | 12.4 | 15.5 | — | — | 0.2 | 71.7 | 0.2 | 129.000 | 633.000 | 4.9 | 1.8 |
| A25 | 86 | 0.5 | 12.3 | 15.5 | — | — | 0.2 | 71.8 | 0.2 | 185.000 | 921.000 | 5.0 | 0.9 |
| A26 | 91 | 0.5 | 13.8 | 15.4 | — | — | 0.20 | 70.4 | 0.2 | 148.000 | 732.000 | 4.9 | 1.4 |

*)comparative example

As already mentioned further above, Examples A1-A5, A13-A16 and A20-A24 are comparative examples wherein $M_w$ is below 700.000 g/mol and/or $M_n$ is below 130.000 g/mol. Examples A6-A12, A17-A19 and A25-A26 are in accordance with the present invention and comprise polyalkyl(meth)acrylate based comb polymers with $M_w$ of 700.000 g/mol or greater and $M_n$ of 130.000 g/mol or greater.

Examples A1 to A11 is a first group of examples which do all comprise similar amounts of monomers (12-13% by weight of MM and about 4% by weight of alkyl acrylates) but were prepared with different $M_w$ and $M_n$. It can be seen that with higher $M_w$ also $M_n$ is increasing as well as D does, whereas the P-factor is decreasing.

Example A12 also shows a similar composition than A1-A11 but were prepared without $C_{16/18}$ alkyl acrylates.

Examples A13 to A19 is a second group of examples which do also comprise similar amounts of monomers (22-23% by weight of MM and no alkyl acrylates) but were prepared with different $M_w$ and $M_n$. Again, it can be seen that with higher $M_w$ also $M_n$ is increasing as well as D does, whereas the P-factor is decreasing.

Figure 2:
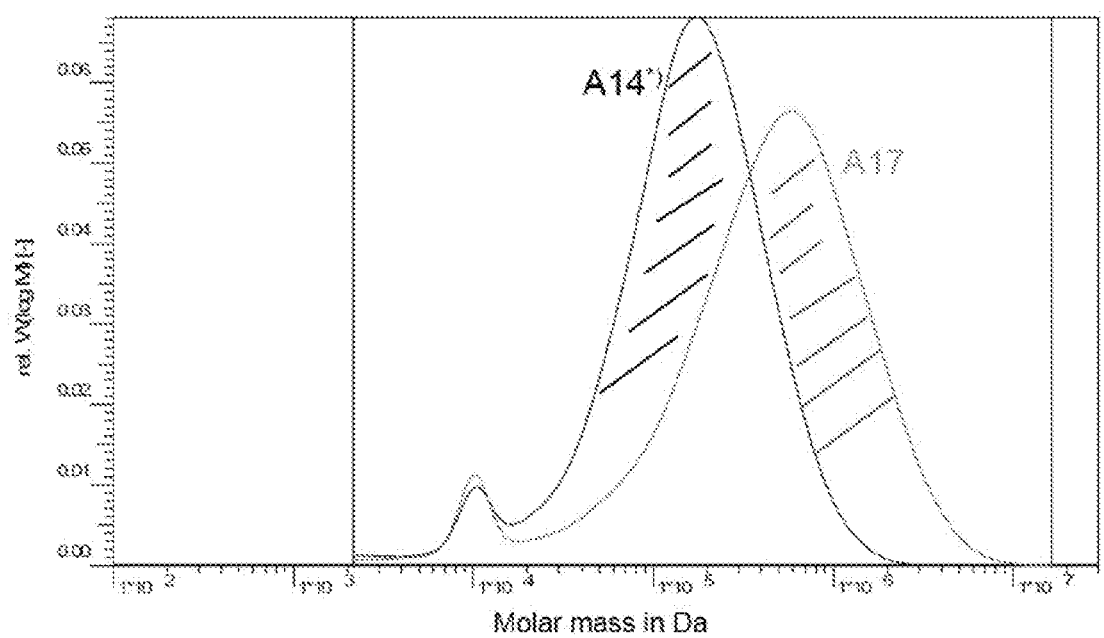
FIG. 2: GPC results showing the shift in molecular weight distributions towards higher molecular weight of polymer A17 prepared according to the present invention versus comparative example A14.

FIG. 2 is showing GPC results of example A17 visualizing the shift in molecular weight distributions towards higher molecular weight. The reduced area at low molecular weight leads to a significantly increased $M_n$ and therefore improved $HTHS_{100}$ and treat rate for example A17 (see Formulation Example C6 in Table 5 further below).

Examples A23 to A26 is a third group of examples which do also comprise similar amounts of monomers (12-13% by weight of MM, no alkyl acrylates and about 15% by weight of $C_{12-15}$ alkyl (meth)acrylates) but were prepared with different $M_w$ and $M_n$. Again, it can be seen that with higher $M_w$ also $M_n$ is increasing as well as D does, whereas the P-factor is decreasing.

Figure 3:
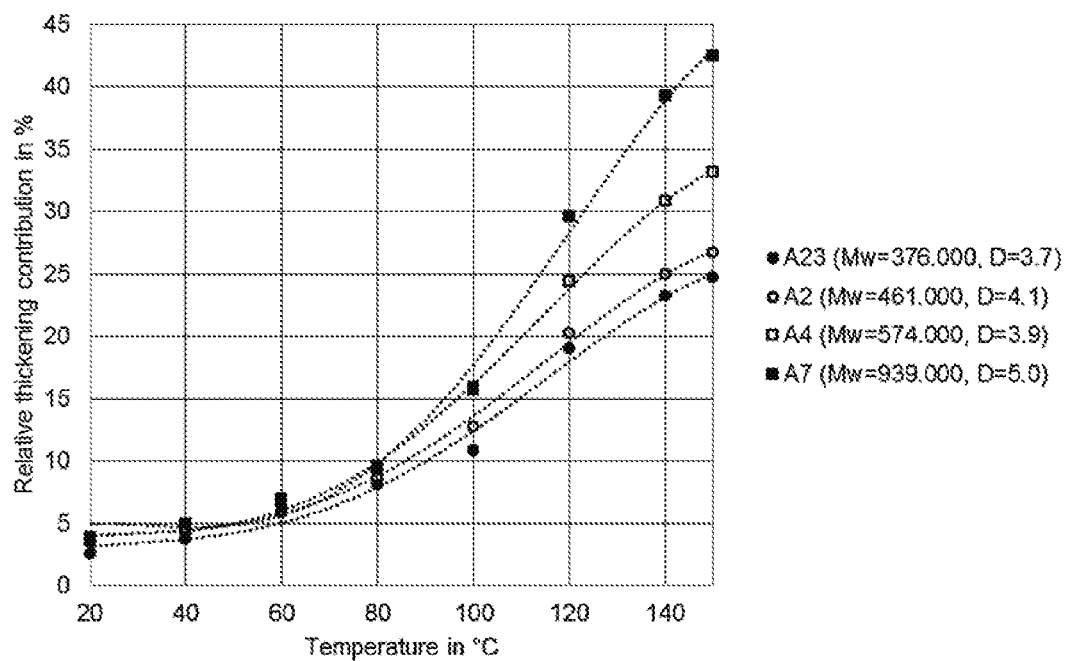
FIG. 3: The relative thickening contribution (RTC) varying with increased weight-average molecular weight $M_w$.
Figure 4:
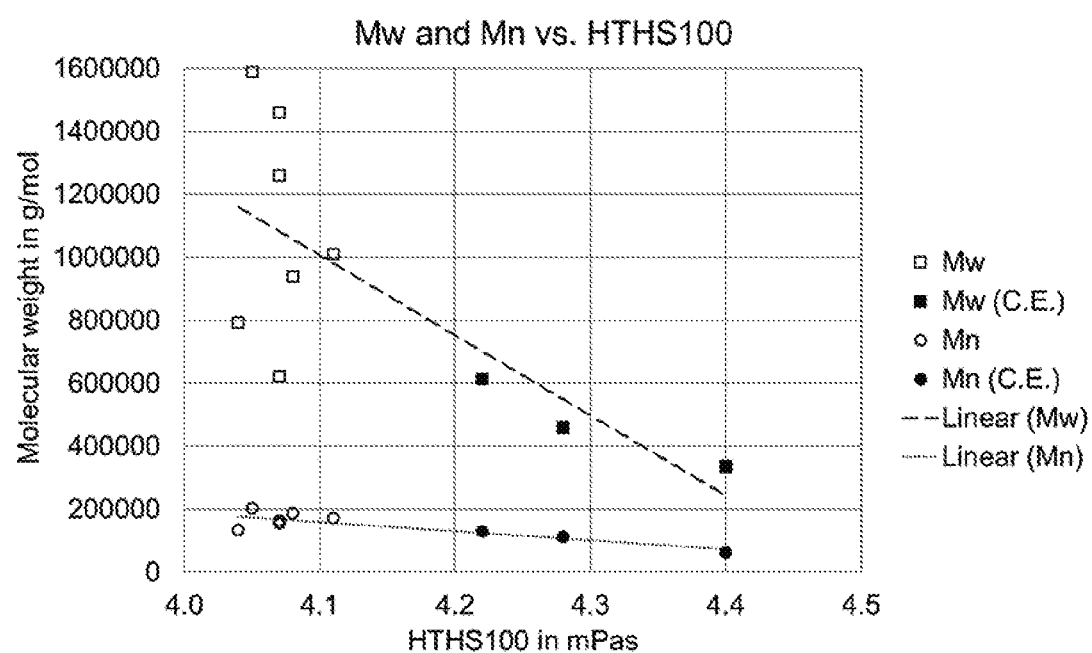
FIG. 4: Molecular weight ($M_w$ and $M_n$) versus $HTHS_{100}$ of examples A5 to A11 and comparative examples A1 to A3 in a 0W20 formulation.
Figure 5:
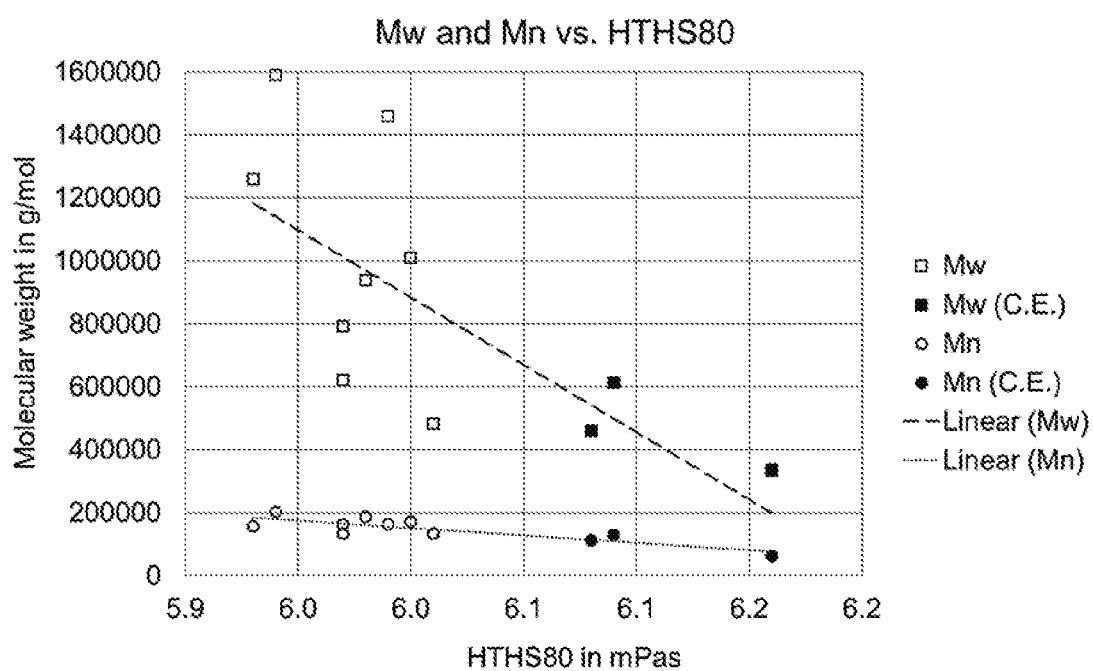
FIG. 5: Molecular weight ($M_w$ and $M_n$) versus $HTHS_{80}$ of examples A5 to A11 and comparative examples A1 to A3 in 0W20 formulation.
Figure 6:
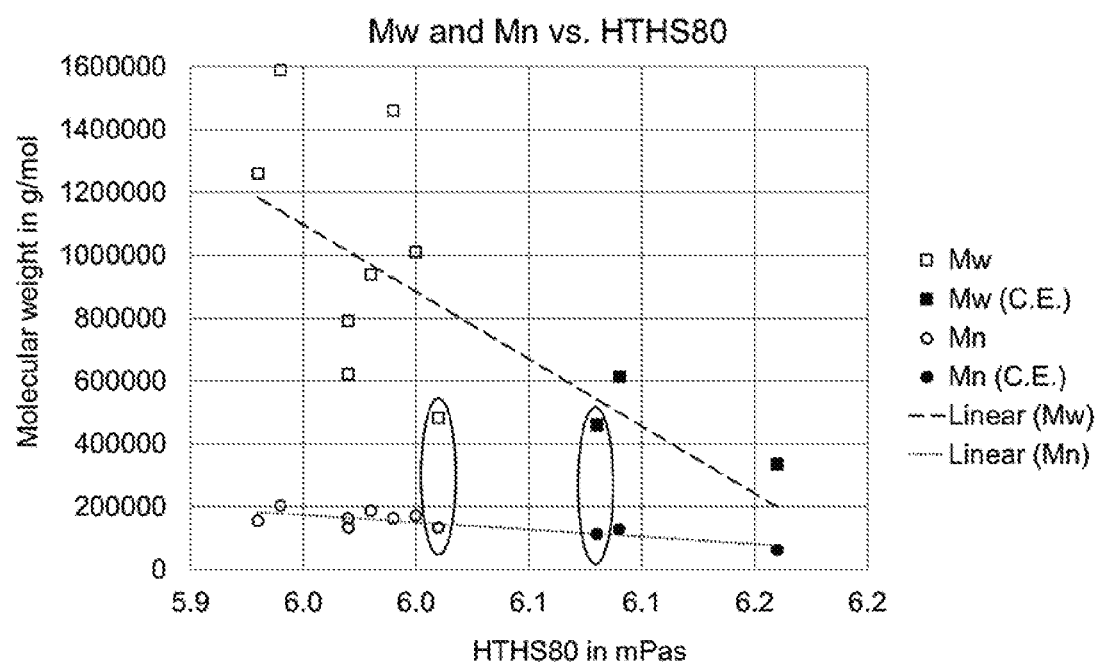
FIG. 6: Molecular weight ($M_w$ and $M_n$) versus $HTHS_{80}$ of examples and comparative examples, where 2 examples with almost similar $M_w$ and slightly different $M_n$ are highlighted.

FIG. 3 shows that the relative thickening contribution (RTC) is increasing selectively at higher temperature (above 80° C.) for the candidates with higher molecular weight distributions (Example A7 compared to Examples A2, A4 and A23). At temperatures below 80° C. the thickening of all candidates is comparably low. This exceptional thickening behavior is considered to be the reason for the unexpectedly low $HTHS_{100}$ and $HTHS_{80}$ values while the treat rate at the given $HTHS_{150}$ of 2.6 mPas is decreased (see Tables 4 and 5 further below).

Evaluation of VI Improvers in Formulations

To demonstrate the effect of polyalkyl(methacrylate) based comb polymers according to the present invention on the $KV_{100}$ and $HTHS_{100}$ performance of lubricating oil compositions different formulation examples B were prepared and the corresponding values are measured. Formulations with Yubase 4 as base oil were prepared by using formulation targets 0W20 according to SAE J300; i.e. it was formulated on an $HTHS_{150}$ target of 2.6 mPas by adding the additives A1-A11 as described in Table 3 above. The resulting additive content was typically between 11 and 14% by weight. Characteristic EO formulation properties ($KV_{100}$, $HTHS_{100}$, $HTHS_{80}$) were measured and are summarized in Table 4.

TABLE 4

| 0W20 engine oil formulations B without DI package in Yubase 4 as base oil. | | | | | | | | | | | |
|---|---|---|---|---|---|---|---|---|---|---|---|
| Parameter | B1*) | B2*) | B3*) | B4*) | B5*) | B6 | B7 | B8 | B9 | B10 | B11 |
| Additive used | A1 | A2 | A3 | A4 | A5 | A6 | A7 | A8 | A9 | A10 | A11 |
| Additive content [%] | 13.5 | 13.3 | 12.5 | 11.7 | 11.7 | 11.6 | 11.8 | 12.0 | 11.8 | 11.5 | 11.5 |
| $HTHS_{150}$ [mPas] | 2.61 | 2.61 | 2.62 | 2.56 | 2.59 | 2.59 | 2.59 | 2.62 | 2.62 | 2.59 | 2.62 |
| $M_n$ [g/mol] | 62.000 | 113.000 | 129.000 | 149.000 | 163.000 | 134.000 | 187.000 | 172.000 | 156.000 | 163.000 | 203.000 |
| $M_w$ [g/mol] | 336.000 | 461.000 | 614.000 | 574.000 | 622.000 | 792.000 | 939.000 | 1.010.000 | 1.260.000 | 1.460.000 | 1.590.000 |
| D | 4.5 | 4.07 | 4.8 | 3.9 | 3.8 | 5.9 | 5.0 | 5.9 | 8.0 | 9.0 | 7.9 |
| P | 5.3 | 2.3 | 1.6 | 1.4 | 1.2 | 1.2 | 0.8 | 0.8 | 0.7 | 0.6 | 0.5 |
| $KV_{40}$ [mm²/s] | 23.73 | 23.26 | 23.14 | 22.83 | 22.83 | 22.83 | 23.06 | 22.93 | 23.51 | 23.4 | 23.87 |
| $KV_{100}$ [mm²/s] | 6.78 | 6.87 | 7.14 | 6.91 | 6.95 | 7.00 | 7.40 | 7.50 | 7.87 | 7.86 | 7.80 |

TABLE 4-continued

0W20 engine oil formulations B without DI package in Yubase 4 as base oil.

| Parameter | B1*) | B2*) | B3*) | B4*) | B5*) | B6 | B7 | B8 | B9 | B10 | B11 |
|---|---|---|---|---|---|---|---|---|---|---|---|
| $HTHS_{80}$ [mPas] | 6.16 | 6.08 | 6.09 | 5.97 | 5.97 | 5.97 | 5.98 | 6.00 | 5.93 | 5.99 | 5.94 |
| $HTHS_{100}$ [mPas] | 4.40 | 4.28 | 4.22 | 4.12 | 4.07 | 4.04 | 4.08 | 4.11 | 4.07 | 4.07 | 4.05 |
| VI | 272 | 286 | 306 | 296 | 299 | 302 | 323 | 332 | 344 | 345 | 333 |
| CCS-35 [mPas] | 3059 | nd | 2987 | nd | nd | nd | nd | 2900 | nd | 2955 | 3021 |
| Noack [%] | 14.3 | nd | 14.2 | nd | nd | nd | nd | 14.2 | nd | 14.9 | 14.1 |

*)comparative example
nd = not determined

The results presented in Table 4 clearly show that with increasing $M_w$ and especially $M_n$ the $KV_{100}$ increased whereas $HTHS_{80}$ and $HTHS_{100}$ decreased (see comparative examples B1-B5 compared to working examples B6-611).

Figure 7:
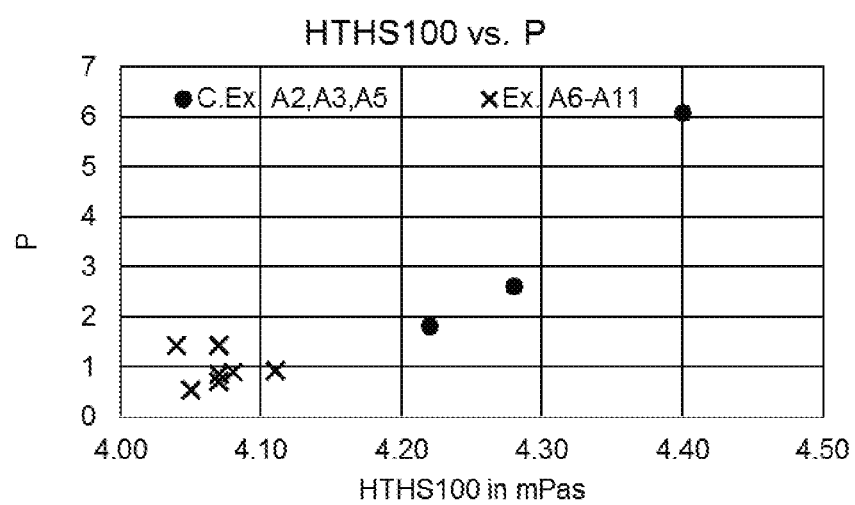
FIG. 7: $HTHS_{100}$ is plotted versus the factor P, which is calculated from $M_w$ and $M_n$ in order to evaluate promising molecular weight distributions.

FIG. 7 visualizes this effect. In this diagram, $HTHS_{100}$ is plotted versus P, the factor calculated from $M_w$ and $M_n$ in order to evaluate promising molecular weight distributions. P values below 1.5 resulted in the best (lowest) $HTHS_{100}$ values which correspond to $M_w$>570.000 g/mol and $M_n$>134.000 g/mol (HTHS data were generated from 0W20 formulations shown in Table 4 using Examples A2, A3 and A5 to A11).

Figure 8:
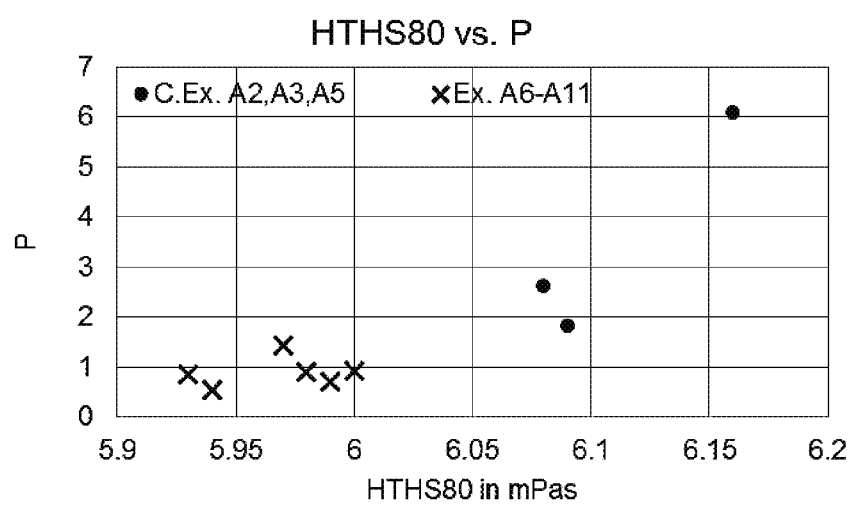
FIG. 8: $HTHS_{80}$ is plotted versus the factor P, which is calculated from $M_w$ and $M_n$ in order to evaluate promising molecular weight distributions (Examples A2, A3 and A5-A11).

FIG. 8 visualizes the effect on $HTHS_{80}$. In this diagram, $HTHS_{80}$ is plotted versus P, the factor calculated from $M_w$ and $M_n$ in order to evaluate promising molecular weight distributions (HTHS data were generated from 0W20 formulations shown in Table 4 using Examples A2, A3 and A5 to A11).

Figure 9:
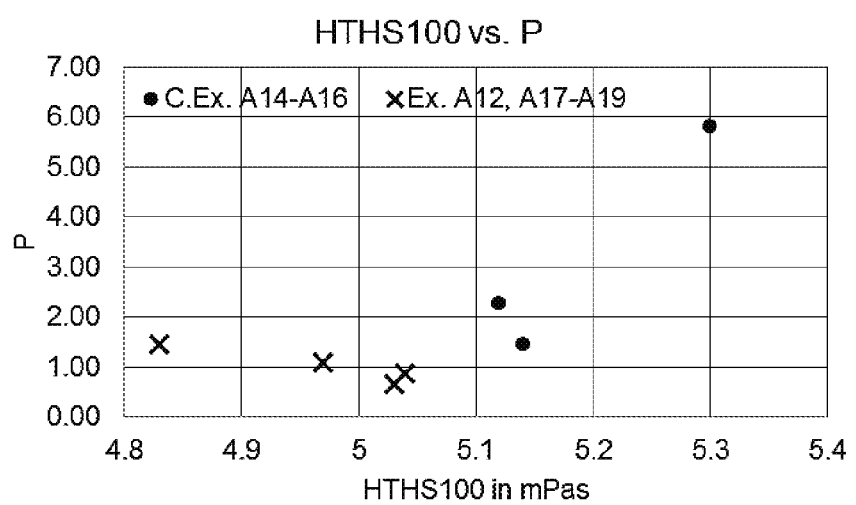
FIG. 9: $HTHS_{100}$ is plotted versus the factor P, which is calculated from $M_w$ and $M_n$ in order to evaluate promising molecular weight distributions (Examples A12 and A14-A19).

FIG. 9 visualizes the effect on Examples A12 and A14 to A19. In this diagram, $HTHS_{100}$ is plotted versus P, the factor calculated from $M_w$ and $M_n$ in order to evaluate promising molecular weight distributions. P-values below 1.3 resulted in the best (lowest) $HTHS_{100}$ values which correspond to $M_w$>780.000 g/mol and $M_n$>133.000 g/mol. (HTHS data were generated from 0W20 formulations shown in Table 5 using examples A12 and A14 to A19).

Figure 10:
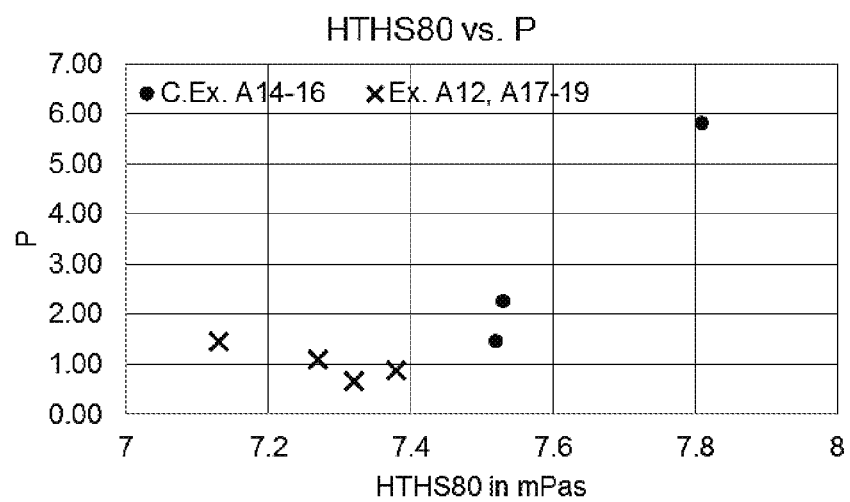
FIG. 10: HTHS$_{80}$ was plotted against the factor P. P values equal to or below 1.5 resulted in the best (lowest) HTHS$_{80}$ values (Examples A12 and A14-A19).

FIG. 10 visualizes the effect on Examples A12 and A14 to A19. In this diagram, $HTHS_{80}$ is plotted against the factor P. P values below 1.3 resulted in the best (lowest) $HTHS_{80}$ values (HTHS data were generated from 0W20 formulations shown in Table 5 using examples A12 and A14 to A19).

TABLE 5

0W20 engine oil formulations C with DI package in Yubase 4 as base oil.

| Parameter | C1*) | C2*) | C3*) | C4*) | C5*) | C6 | C7 | C8 | C9 |
|---|---|---|---|---|---|---|---|---|---|
| Additive used | A1 | A2 | A14 | A15 | A16 | A17 | A18 | A19 | A12 |
| Additive content [%] | 9.6 | 8.0 | 9.4 | 8.0 | 8.0 | 6.9 | 7.2 | 6.8 | 7.3 |
| $HTHS_{150}$ [mPas] | 2.60 | nd | 2.62 | 2.63 | 2.65 | 2.58 | 2.64 | 2.64 | 2.56 |
| $M_n$ [g/mol] | 79.000 | 113.000 | 86.000 | 115.000 | 149.000 | 174.000 | 190.000 | 198.000 | 133.000 |
| $M_w$ [g/mol] | 214.000 | 461.000 | 238.000 | 539.000 | 676.000 | 788.000 | 951.000 | 1.280.000 | 782.000 |
| D | 2.7 | 4.1 | 2.8 | 4.7 | 4.5 | 4.5 | 5.0 | 6.5 | 5.9 |
| P | 6.0 | 2.3 | 5.1 | 2.0 | 1.3 | 1.0 | 0.8 | 0.6 | 1.3 |
| $KV_{40}$ [mm²/s] | 29.99 | nd | 30.00 | 29.13 | 29.12 | 28.55 | 28.83 | 28.71 | 28.04 |
| $KV_{100}$ [mm²/s] | 7.11 | nd | 7.17 | 7.54 | 7.86 | 7.62 | 7.95 | 8.27 | 7.28 |
| $HTHS_{80}$ [mPas] | 7.79 | nd | 7.81 | 7.53 | 7.52 | 7.27 | 7.38 | 7.32 | 7.13 |
| $HTHS_{100}$ [mPas] | 5.29 | nd | 5.30 | 5.12 | 5.14 | 4.97 | 5.04 | 5.03 | 4.83 |
| VI | 213 | nd | 216 | 245 | 262 | 256 | 270 | 288 | 244 |
| CCS-35 [mPas] | 4439 | nd | 4437 | 4414 | 4364 | 4280 | 4321 | 4318 | nd |
| Noack [%] | 13.7 | nd | nd | 13.9 | 14.2 | 13.7 | 13.3 | 13.5 | 13.0 |

| Parameter | C10*) | C11*) | C12*) | C13*) | C14*) | C15 | C16 |
|---|---|---|---|---|---|---|---|
| Additive used | A20 | A21 | A22 | A23 | A24 | A25 | A26 |
| Additive content [%] | 9.6 | nd**) | nd**) | 8.2 | 7.9 | 7.5 | 8.0 |
| $HTHS_{150}$ [mPas] | 2.60 | nd | nd | 2.59 | 2.58 | 2.63 | 2.62 |
| $M_n$ | 79.000 | 117.000 | 197.000 | 102.000 | 129.000 | 185.000 | 148.000 |
| $M_w$ | 214.000 | 509.000 | 674.000 | 376.000 | 633.000 | 921.000 | 732.000 |
| D | 2.7 | 4.4 | 4.9 | 3.7 | 4.9 | 5.0 | 4.94 |

TABLE 5-continued

0W20 engine oil formulations C with DI package in Yubase 4 as base oil.

| P | 6.4 | 2.0 | 1.0 | 3.0 | 1.5 | 0.8 | 1.37 |
|---|---|---|---|---|---|---|---|
| $KV_{40}$ [mm²/s] | 7.11 | nd | nd | 27.91 | 27.63 | 28.07 | 27.94 |
| $KV_{100}$ [mm²/s] | 29.99 | nd | nd | 6.97 | 7.02 | 7.10 | 750 |
| $HTHS_{80}$ [mPas] | 7.79 | nd | nd | 7.02 | 6.95 | 6.92 | 7.08 |
| $HTHS_{100}$ [mPas] | 5.29 | nd | nd | 4.84 | 4.72 | 4.78 | 4.86 |
| VI | 213 | nd | nd | 228 | 234 | 244 | 257 |
| CCS-35 [mPas] | 4439 | nd | nd | nd | nd | 4338 | nd |
| Noack [%] | 13.7 | nd | nd | nd | nd | 13.2 | nd |

*⁾comparative example
**⁾polymer was not soluble
nd = not determined

In addition to the performance advantage in $HTHS_{80}$ and $HTHS_{100}$ the inventive examples exhibited lower treat rates than the comparative examples. This led to a significant advantage in the formulation of engine oils. For example, the treat rate of A12 in the 0W20 formulation, which shows the best HTHS performance of all the polymers with this composition, was reduced by 22% as compared to A14. The lower treat rate leads to enormous economic advantages as well as potentially improved deposits in diesel engines. The reason for the decreased treat rate can be found in the special temperature viscosity behavior of the inventive polymers in oils. As shown in FIG. 3, the relative thickening contribution of the new polymers selectively increased in the temperature range between 100° C. and 150° C. while the thickening at low temperature remained very low. Especially, the thickening contribution at 150° C. had a major influence on the treat rate in the 0W20 formulation and the higher the thickening at 150° C. the lower the treat rate was in the formulation. This effect was very surprising because usually when the thickening of a polymer is increased at for example 150° C., it increases at lower temperatures as well. This is not the case for the inventive polymers; they selectively contribute to the thickening in the high temperature range above 100° C.

TABLE 6

0W20 engine oil formulations D with DI package in Yubase 4 as base oil.

| Product | D1*⁾ | D2 |
|---|---|---|
| A23 [%] | 8.3 | — |
| A12 [%] | — | 7.3 |
| OLOA 55501 [%] | 8.9 | 8.9 |
| Yubase 4 | 82.8 | 83.8 |
| Sum | 100 | 100 |

| Test | Method | | |
|---|---|---|---|
| $KV_{100}$ [mm²/s] | ISO 3104 | 7.00 | 7.20 |
| $KV_{40}$ [mm²/s] | ISO 3104 | 28.05 | 28.22 |
| VI | ISO 2909 | 228 | 237 |
| CCS @ −35° C. [mPas] | | 4312 | 4398 |
| Noack (1 h at 250° C.) | | | 13.2 |
| HTHS @ 80° C. [mPas] | CEC L-036 | 7.28 | 7.25 |
| HTHS @ 100° C. [mPas] | CEC L-036 | 4.87 | 4.73 |
| HTHS @ 150° C. [mPas] | CEC L-036 | 2.61 | 2.65 |
| After shear | | | |
| $KV_{100}$ [mm²/s] | | 6.93 | 7.11 |
| $KV_{40}$ [mm²/s] | | 28.06 | 28.16 |
| VI | | 224 | 233 |
| PSSI @ 100° C. | | 0 | 0.7 |
| PSSI @ 40° C. | | 2.7 | 3.1 |

*⁾ comparative example

In Table 6, a typical 0W20 engine oil formulation is shown. It was formulated to a target value of $HTHS_{150}=2.6$ mPas using 8.9% of the DI package OLOA 55501, Yubase 4 as base oil and the respective amount of additive. The inventive example A12 with higher molecular weight (706.000 g/mol) than the comparative example (376.000 g/mol) showed improved lower $HTHS_{80}$ and $HTHS_{100}$ values which are indicators for improved fuel economy. At the same time the treat rate was improved (=reduced) significantly by 12% demonstrating the effectiveness of the inventive additive. The reduction in treat rate can be directly linked to a reduction in total formulation costs. Moreover, reducing the treat rate is expected to reduce deposits of the formulation since it is known that the treat rate of the additives has a major influence on the formation of deposits. This relationship can be verified for example via the Microcoking test (GFC-LU-27-A-13) of the formulation examples shown here.

Numerous modifications and variations on the present invention are possible in light of the above teachings. It is therefore to be understood that within the scope of the appended claims, the invention may be practiced otherwise than as specifically described herein.

The invention claimed is:

1. A polyalkyl(meth)acrylate based comb polymer, consisting of:
   (a) 10 to 25% by weight of an ester of (meth)acrylic acid and a hydroxylated hydrogenated polybutadiene;
   (b) 0% to 5% by weight of at least one $C_{4-18}$ alkyl acrylate;
   (c) 0% to 0.3% by weight of methyl methacrylate;

(d) 60% to 75% by weight of n-butyl methacrylate;
(e) 5% to 20% by weight of at least one $C_{10-30}$ alkyl (meth)acrylate; and
(f) 0% to 2% by weight of at least one styrene monomer,
wherein the polyalkyl(meth)acrylate based comb polymer has a weight-average molecular weight $M_w$ of 700,000 g/mol or greater and a number-average molecular weight $M_n$ of 130,000 g/mol or greater, determined by size exclusion chromatography (SEC) using a polymethylmethacrylate standard.

2. The polyalkyl(meth)acrylate based comb polymer according to claim 1, wherein the weight-average molecular weight $M_w$ is from 700,000 to 2,000,000 g/mol and the number-average molecular weight $M_n$ is from 130,000 to 300,000 g/mol, determined by size exclusion chromatography (SEC) using a polymethylmethacrylate standard.

3. The polyalkyl(meth)acrylate based comb polymer according to claim 1, having a value P of 1.5 or lower:

$$P = \frac{M_w^{-0.8}}{M_n} \times 10^{10} \leq 1.5.$$

4. A method of increasing $KV_{100}$ and in parallel decreasing $HTHS_{100}$ and $HTHS_{80}$ of a lubricating oil composition, the method comprising adding the polyalkyl(meth)acrylate based comb polymer according to claim 1 to a lubricating oil composition in need thereof.

5. An additive composition, comprising:
(A) 60 to 80% by weight of a base oil, and
(B) 20 to 40% by weight of a polyalkyl(meth)acrylate based comb polymer, which has a weight-average molecular weight $M_w$ of 700,000 g/mol or greater and a number-average molecular weight $M_n$ of 130,000 g/mol or greater, determined by size exclusion chromatography (SEC) using a polymethylmethacrylate standard,
wherein the polyalkyl(meth)acrylate based comb polymer (B) consists of the following monomers:
(a) 10 to 25% by weight of an ester of (meth)acrylic acid and a hydroxylated hydrogenated polybutadiene;
(b) 0% to 5% by weight of at least one $C_{4-18}$ alkyl acrylate;
(c) 0% to 0.3% by weight of methyl methacrylate;
(d) 60% to 75% by weight of n-butyl methacrylate;
(e) 5% to 20% by weight of at least one $C_{10-30}$ alkyl (meth)acrylate; and
(f) 0% to 2% by weight of at least one styrene monomer.

6. The additive composition according to claim 5, wherein the weight-average molecular weight $M_w$ of component (B) is from 700,000 to 2,000,000 g/mol and the number-average molecular weight $M_n$ is from 130,000 to 300,000 g/mol, determined by size exclusion chromatography (SEC) using a polymethylmethacrylate standard.

7. A method of increasing $KV_{100}$ and in parallel decreasing $HTHS_{100}$ of a lubricating oil composition, the method comprising adding the additive composition according to claim 5 to a lubricating oil composition in need thereof.

8. A lubricating oil composition, comprising:
(A) 80 to 99.5% by weight of a base oil;
(B) 0.5 to 5% by weight of a polyalkyl(meth)acrylate based comb polymer, which has a weight-average molecular weight $M_w$ of 700,000 g/mol or greater and a number-average molecular weight $M_n$ of 130,000 g/mol or greater, determined by size exclusion chromatography (SEC) using a polymethylmethacrylate standard; and
(C) 0 to 15% by weight of one or more further additives,
wherein component (B) consists of:
(a) 10 to 25% by weight of an ester of (meth)acrylic acid and a hydroxylated hydrogenated polybutadiene;
(b) 0% to 5% by weight of at least one $C_{4-18}$ alkyl acrylate;
(c) 0% to 0.3% by weight of methyl methacrylate;
(d) 60% to 75% by weight of n-butyl methacrylate;
(e) 5% to 20% by weight of at least one $C_{10-30}$ alkyl (meth)acrylate; and
(f) 0% to 2% by weight of at least one styrene monomer.

9. The lubricating oil composition according to claim 8, wherein the weight-average molecular weight $M_w$ of component (B) is from 700,000 to 2,000,000 g/mol and the number-average molecular weight $M_n$ is from 130,000 to 300,000 g/mol, determined by size exclusion chromatography (SEC) using a polymethylmethacrylate standard.

10. The lubricating oil composition according to claim 8, wherein component (C) is at least one selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

11. A process for preparing the polyalkyl(meth)acrylate based comb polymer according to claim 1, the process comprising:
(a) preparing a reaction mixture comprising monomers and a first dilution oil, wherein the monomers are present in an amount of 40 to 65% by weight;
(b) heating 50% of the reaction mixture prepared under (a) to a first temperature of from 80 to 120° C.;
(c) adding 0.05 to 0.1%, based on the total amount of the monomers, of a first initiator to the reaction mixture as prepared under (b), the first initiator having a half-life $T_{1/2}$ of from 100 to 200 minutes, at the first temperature according to (b);
(d) adding a further amount of the reaction mixture prepared under and further 0.05 to 0.1% of the first initiator during a time of from 2 to 4 hours;
(e) maintaining the reaction mixture prepared under (d) for a time of 0.5 to 3 hours at the first temperature;
(f) diluting the reaction mixture prepared under (e) during a time of 0.5 to 3 hours to 30% with a second dilution oil, which can be the same or different than the first dilution oil, comprising a further amount of the first initiator;
(g) optionally adding further amount of the first initiator or a second initiator, which can be the same as or different than the first initiator, to the reaction mixture prepared under (e) and maintaining for at least 2 hours; and
(h) diluting the reaction mixture prepared under (g) by addition of the first dilution oil or the second dilution oil.

12. The process according to claim 11, wherein the first and second initiators are the same or different and are each independently selected from the group consisting of azo initiators, and peroxy compounds.

13. The process according to claim 11, wherein the first initiator is 1,1-di-tert-butylperoxy-3,3,5-trimethylcyclohexan and the second initiator is tert-butylperoxy 2-ethylhexanoate or 1,1-di-tert-butylperoxy-3,3,5-trimethylcyclohexan.

14. The process according to claim 11, wherein the first and second dilution oils are the same or different and are each independently selected from the group consisting of API Group I, II, III, IV, V and mixtures thereof.

15. The process according to claim 12, wherein the first and second initiators are each independently at least one selected from the group consisting of azobis-isobutyronitrile (AIBN), 2,2'-azobis(2-methylbutyronitrile) (AMBN), 1,1-azobiscyclohexanecarbonitrile, methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

16. The lubricating oil composition of claim 8, having a $KV_{100}$ of at least 6.9 mm$^2$/s.

17. The lubricating oil composition of claim 8, having a $KV_{100}$ of at least 6.9 mm$^2$/s and an $HTHS_{80}$ of 6.0 mPas or less.

\* \* \* \* \*